United States Patent [19]

DeJonge

[11] 4,312,041
[45] Jan. 19, 1982

[54] FLIGHT PERFORMANCE DATA COMPUTER SYSTEM

[75] Inventor: Michael K. DeJonge, Wyoming, Mich.

[73] Assignee: Lear Siegler, Inc., Santa Monica, Calif.

[21] Appl. No.: 880,219

[22] Filed: Feb. 22, 1978

[51] Int. Cl.³ .............................................. G06F 15/50
[52] U.S. Cl. .............................. 364/442; 340/27 NA; 364/431.02; 364/444
[58] Field of Search ............... 364/427, 430, 431, 442, 364/444; 340/27 R, 27 NA

[56] References Cited

U.S. PATENT DOCUMENTS

| | | | |
|---|---|---|---|
| 3,039,693 | 6/1962 | Schwarm | 364/419 X |
| 3,135,861 | 6/1964 | Burggren | 364/424 X |
| 3,153,143 | 10/1964 | Fogarty | 364/442 |
| 3,361,394 | 1/1968 | Pfersch | 364/424 X |
| 3,496,534 | 2/1970 | Andresen, Jr. | 340/27 |
| 3,612,837 | 10/1971 | Brandau | 364/442 X |
| 3,668,622 | 6/1972 | Gannett et al. | 340/27 R |
| 3,685,034 | 8/1972 | Hedrick | 340/27 NA X |
| 3,697,731 | 10/1972 | Kempema et al. | 364/431 |
| 3,758,765 | 9/1973 | Vietor | 364/430 |
| 3,774,017 | 11/1973 | Zagalsky | 364/424 |
| 3,816,716 | 6/1974 | DeGarmo | 364/446 |
| 3,852,956 | 12/1974 | Martin | 364/431 X |
| 3,927,307 | 12/1975 | Reschak | 364/431 |
| 3,979,057 | 9/1976 | Katz et al. | 364/443 X |
| 3,980,258 | 9/1976 | Simeon | 364/448 X |
| 3,998,411 | 12/1976 | Blechen | 364/426 X |
| 4,063,072 | 12/1977 | Sochtig et al. | 364/442 X |

FOREIGN PATENT DOCUMENTS 851576 9/1970 Canada ............................... 364/442

Primary Examiner—Jerry Smith
Attorney, Agent, or Firm—John E. McGarry; Thomas L. Lockhart

[57] ABSTRACT

A flight performance data system comprises a control and display unit operably connected to a computer. The computer has input means responsive to real air mass parameters and real aircraft dynamic measurements. The computer is programmed to respond to the incoming signals and automatically generate various output signals representing flight profile data. A mode selector is operably connected to the computer to direct the computer in different modes to determine the different flight profile data for the climb, cruise, descent and other modes of the aircraft. For various modes, a different flight schedule can be determined corresponding to the most fuel efficient flight, a long-range cruise flight, or the most economical flight. In addition, the computer produces output signals corresponding to the maximum rate of climb and the maximum rate of descent in the climb and descent modes, respectively. A display screen selectively displays the desired flight profile data. In addition, given desired variables can be supplied by the pilot to the computer and the computer automatically generates an output signal corresponding to the flight profile data consistent with the desired variables.

25 Claims, 27 Drawing Figures

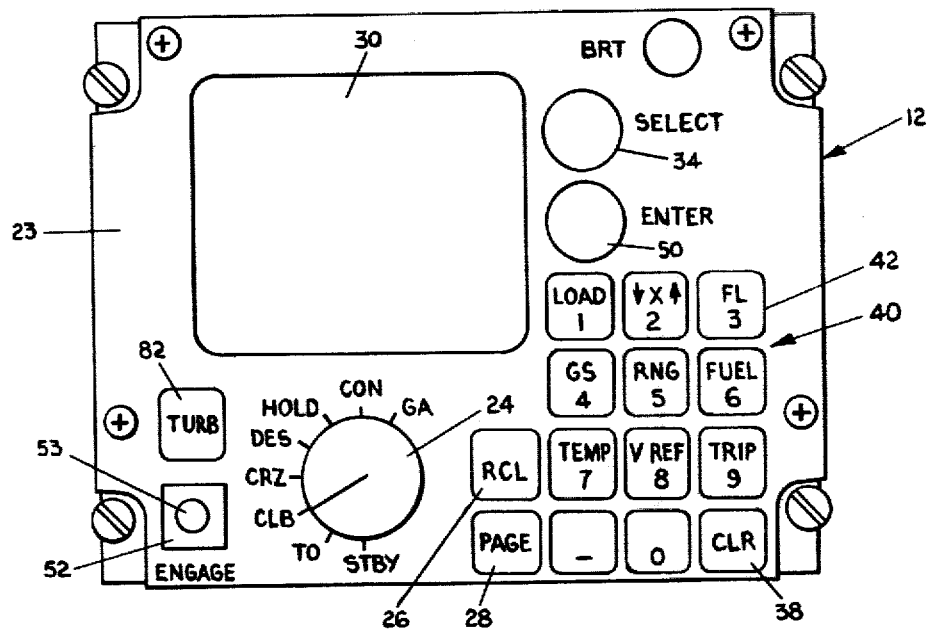
FIG. 3
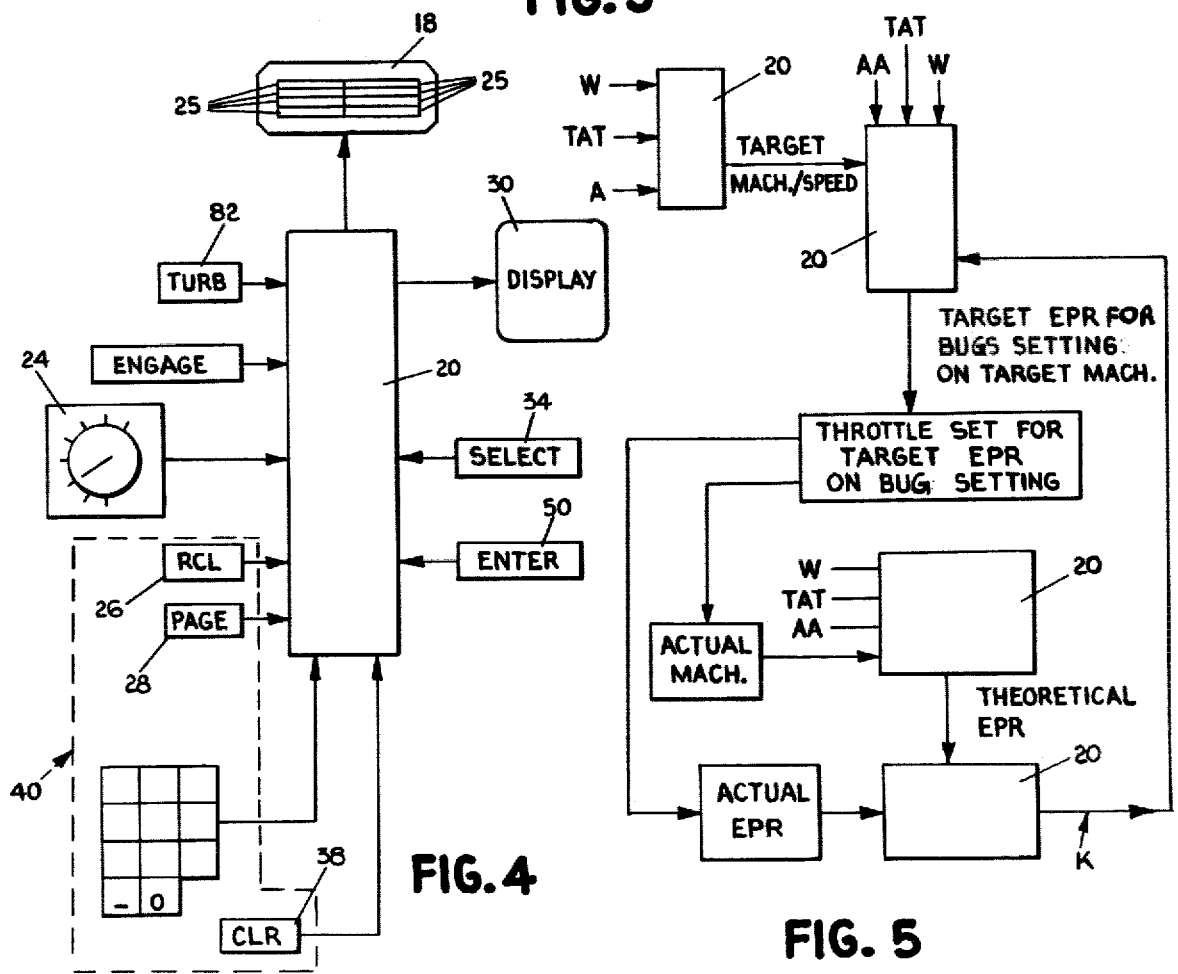
FIG. 4
FIG. 5

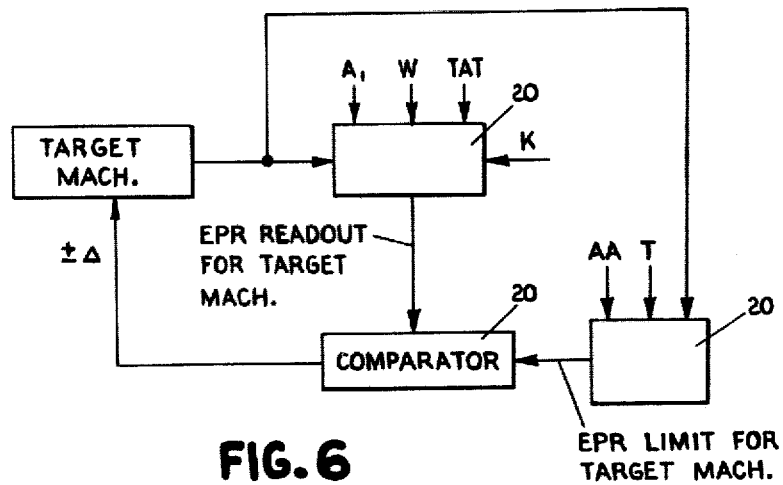
FIG. 6
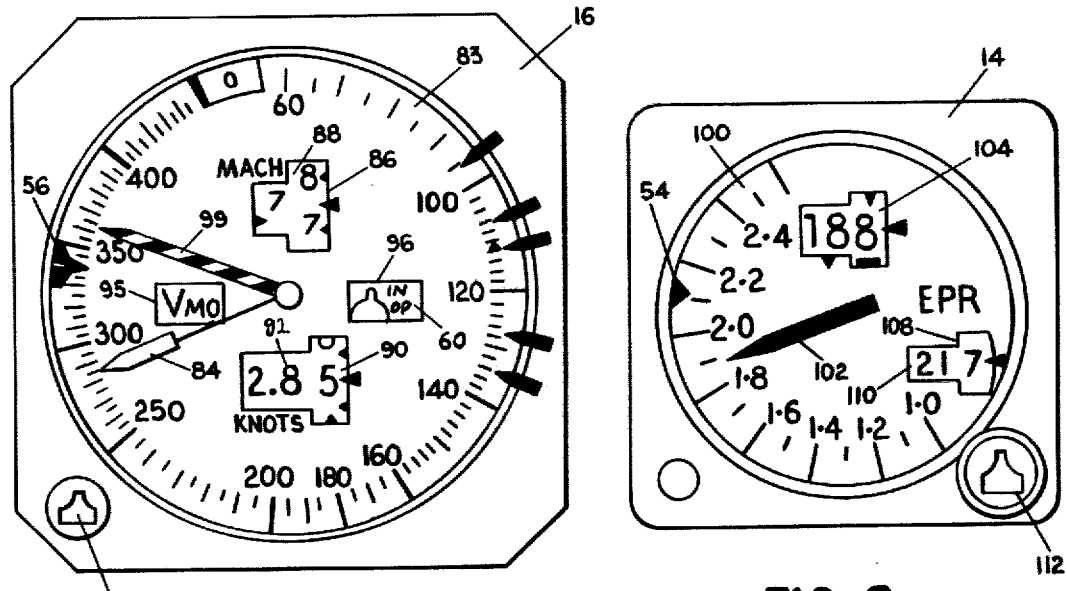
FIG. 7
FIG. 8
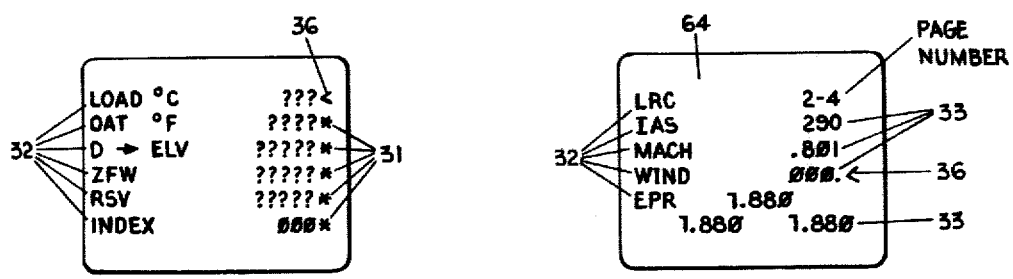
FIG. 9
FIG. 10

FIG. 27

FLIGHT PERFORMANCE DATA COMPUTER SYSTEM

BACKGROUND OF THE INVENTION

1. Field of the Invention

This invention relates to systems used in analyzing real parameters of aircraft flight and producing visual flight profile data. In particular, the invention relates to a system for providing data indicating the most economical, the most fuel efficient, or long-range cruise profile depending upon real flight parameters.

2. Description of the Prior Art

Over the past few years, the cost of petroleum fuels and the cost of labor have greatly increased, affecting many industries, including the air transportation industry. Jet powered aircraft transport the majority of people who travel by air, particularly for overseas or other long distance flights. The amount of fuel consumed in one flight can be thousands of pounds. All commercial aircraft jets are capable of tremendous speeds. Some commercial jet aircrafts now exceed the speed of sound with faster speeds promised in the future.

The pilot's work has grown increasingly complex due to the high speeds, the large sizes of the jet aircraft, the increased air traffic, and the inherent complex nature of the forces acting to keep the jet aircraft in flight.

The pilot realizes that by flying the aircraft at certain speeds and certain altitudes he can get better performance from the aircraft. But in the time it would take to accurately figure out the correct speed and correct altitude, the pilot could be approaching the airport of destination. Therefore, in the past, booklets containing charts with various engine pressure ratios, altitudes and speeds have beem compiled for use by the pilot. The pilot looks through the charts and picks the closest profile that he wants to fly and still maintain adequate performance from his aircraft. However, slight discrepancies between the real parameters of the aircraft and the theoretical parameters used to obtain the charts can result in substantial error, resulting in excess fuel burned and excess time required in flight.

Several previous devices which have been used on aircraft use real variables of the aircraft and analyze the variables to produce signals which represent the optimum speed and altitude to obtain maximum distance to maximum endurance in the air. One such device is disclosed in U.S. Pat. No. 3,153,143 issued to Fogarty on Oct. 13, 1964. The Fogarty device utilizes real parameters, including weight and the change of weight as fuel is consumed, to compute the maximum range or maximum endurance.

Another such device is disclosed in U.S. Pat. No. 3,612,837 issued to Brandau on Oct. 12, 1971. The Brandau device has a warning indicator which is actuated when excessive fuel consumption is detected. The system uses real data of the flight to compute fuel reserves, time to target, and the range or endurance of the flight at different altitudes.

As opposed to military aircraft that are on a strategic flight where the time and endurance are main factors in determining whether the aircraft can hit a military target, the pilots of passenger aircraft are usually more concerned with how they can arrive at a destination with a minimum amount of fuel consumed and minimum cost per flight. Particularly with "jumbo jets" the crew of an aircraft can involve many people both on the ground and in the air. The wages of the crew are often directly dependent on the amount of time the flight takes. Time-dependent costs are lowered at greater speeds but it still may be undesirable to fly at the fastest possible speeds becaue fuel costs are increased due to increased consumption at greater speeds which may offset any gain in lower time-dependent costs.

While the air transportation company is concerned with total costs per flight, the pilots are mainly concerned with aircraft performance factors and cannot spend a great amount of time to calculate the proper speed to minimize total costs. The pilot has too many other factors to demand his attention. Not only must he know what his maximum speed or maximum altitude is, he also must take into consideration his engine pressure ratio limits for his jet engines. The engine pressure ratio limits are dependent on both the altitude and the speed at which his aircraft is flying. It also takes a great amount of time to calculate a safe maximum speed which is often desired without exceeding the certified engine pressure ratio limits of the jet engines.

Speed control devices have been utilized to control and maintain the speed of the aircraft. Some examples of speed control devices are disclosed in U.S. Pat. No. 3,998,411 to Blechen issued on Dec. 21, 1976, and U.S. Pat. No. 4,029,946 issued to Gerstine et al on June 14, 1977. The Gerstine reference discloses a converging control system which sends a progressively smaller signal to a throttle control as a moving object approaches the desired set speed so as to prevent overshooting. However, neither of the references disclose an on-board computer system in which the maximum safe speed is determined without exceeding the engine pressure ratio limit.

Not only must the pilot of the passenger jet craft determine the most efficient flight profile, he must also take into account the comfort of the passengers. It is known that fuel is used most efficiently when the engine pressure ratios are at a minimum. However, slight fluctuation in the engine pressure ratios results in a substantial difference in speed of the aircraft which can be uncomfortably felt by the passengers. When the fuel is used at only 99% efficiency rather than 100%, a substantially more comfortable flight with less speed fluctuations is obtained. Thus, for many long-range cruises, it is desirable that pilots set their aircraft into a flight profile which is commonly known as a long-range cruise profile. The calculations for the long-range cruise profile can be as difficult to obtain as the maximum speed profile or the minimum trip cost flight profile. Charts have been provided to pilots which provide certain profiles for certain flight parameters. As with the minimum fuel profiles, the charts do not necessarily reflect the real flight parameters of the aircraft or the degraded performance of the particular aircraft.

A performance data system is needed which receives signals indicating real flight parameters and produces, according to the desires of the pilot, a most economical flight profile, long-range cruise flight profile, the most fuel efficient flight profile, or the fastest speed or highest altitude possible within the engine pressure ratio limits of the jet engines.

SUMMARY OF THE INVENTION

According to the invention, an on-board aircraft computer system is used with jet-powered aircraft to calculate aircraft flight parameters from real time input data. The computer system has input means located at various parts of the aircraft for producing input signals indicative of real air mass parameters and real aircraft dynamic measurements representing flight parameters of the aircraft. Preferably, the air mass parameters include total air temperature and the ambient altitude pressure, from which engine pressure ratio limits can be derived in a conventional fashion. The airplane dynamic measurements preferably include the weight of the plane, cargo, fuel and passengers, and the actual mach.

Computer means are operably coupled to the input means and respond to the real data received from the input means for producing output signals representing flight profile data for maximum fuel efficiency.

Further according to the invention, the computer means utilize the real data received from the input means for computing a flight profile for minimum total cost of the flight. Preferably, program means produce the minimum cost profile by utilizing the maximum fuel efficient flight profile altered by a cost index factor received by the input means. The cost index factor represents the ratio of time dependent costs to the unit fuel costs.

Preferably, the computer means take into account the degraded performance of the aircraft due to engine wear and body stress resulting in excess drag. The computer produces output signals representing theoretical engine pressure ratio (EPR) of the airplane engines and compares the theoretical EPR with an actual EPR output signal. The computer responds to the detected difference and produces an output signal corresponding to a degraded performance factor indicating the difference between the ideal conditions for computing a theoretical EPR and the existing conditions of excess drag for computing the actual EPR. The computer means respond to the degraded performance factor output signal and produce output signals indicating the desired flight profile data, taking into account the degraded performance of the aircraft.

Preferably, the computer means has a filter means for selecting only the actual EPR values when the aircraft is in a steady state with little or no fluctuation in the EPR, mach, and altitude readings over a predetermined period of time. The program means compares the selected actual EPR readings to the theoretical EPR for producing the degraded performance factor output signal. Preferably, the computer means takes a plurality of sequential EPR readings within a fairly short period of time and each reading is compared to the corresponding theoretical EPR and averaged in with previous readings.

Preferably, a mode selector having a climb, cruise, and descent position is operably coupled to the computer means. The computer means produces output signals representing the optimum altitude, mach and engine pressure ratios when the mode selector is in the cruise position. The computer means produces output signals representing engine pressure ratio limits and optimum mach speed when the mode selector is in the climb position. The computer means produces output signals indicating the distance from the destination where descent should commence, the time it takes for the descent, and desirable air speed for an optimum descent when the mode selector is in the descent position.

When the mode selector is in the climb position the desirable air speed output is dependent upon a schedule selector which is operable between a most economical schedule and maximum rate schedule position.

The computer means produces a desirable airspeed output signal corresponding to the maximum rate of climb when the mode selector is in the climb position and the schedule selector is in the maximum rate schedule position. The desirable airspeed output reflects the most economical climb speed when the schedule selector is in the most economical schedule position.

Preferably, the second selector is actuable between a long-range cruise flight schedule and most economical flight schedule, when the mode selector is in the cruise mode. When the selector is in long-range cruise schedule, the computer means produces output signals representing a long-range cruise schedule where the fuel efficiency is approximately 99% of the maximum possible. The most economical flight schedule is obtained when the second selector is actuated to the corresponding schedule position.

Further according to the invention, the computer means generates output signals corresponding to the maximum altitude or maximum speed consistent with confines defined by the engine pressure ratio limits of the jet engines. Preferably, the computer means generates the output signals for maximum altitude and maximum speed by responding to a target speed input signal or target altitude input signal and producing an EPR output signal readout for the speed and altitude.

The computer means also produces an output signal corresponding to the EPR limits for the target mach or target altitude and compares the EPR limit signal with the EPR readout signal. The computer means produce a delta function signal which is added to or subtracted from the target input signal responsive to whether the EPR readout was less or greater than the EPR limits output signal. The computer responds to the delta function signal and the target speed or target altitude signal, obtaining a modified target speed or modified target altitude. A second EPR limit signal is compared with a second EPR readout signal for the modified target signal. A subsequent delta function signal is produced until the EPR readout signal is equal to the EPR limit signal, indicating the target mach or target altitude is the maximum safe mach or altitude allowed.

The indicating means is operably connected to the mode selector and schedule selector such that only one flight profile schedule corresponding to the selected mode is indicated. Preferably, the indicating means comprises a cathode ray tube able to produce visual readout signals on a fluorescent display screen.

In one specific embodiment, an altitude performance selector is operably coupled to the computer means between an inactive and actuated position. The computer means produces output signals representing optimum altitude and a needed wind component for any given altitude to obtain a flight schedule equally efficient to the flight schedule at the real flight altitude when the altitude performance selector is actuated.

In one embodiment of the invention, an altitude intercept performance key is actuably connected to the computer means. The computer means produces output signals representing the time and distance required to achieve an altitude differing from the real flight altitude.

In operation, the pilot may feed to the output means real variables or the real variables may be automatically indicated through conventional sensors connected at proper positions to the aircraft to indicate various parameters of the aircraft. The pilot merely selects the desired mode and actuates the desired selector to obtain information on the indicator display screen. The pilot may follow the obtained flight profile data, making his flight more efficient and easier by giving the pilot more time for performing other duties.

BRIEF DESCRIPTION OF THE DRAWINGS

Reference will now be made to the accompanying drawings in which:

FIG. 3 is an enlarged view of the control and display panel according to the invention;

FIG. 4 is a block diagram illustrating the computer connections with the control and display panel;

FIG. 5 is a block diagram illustrating one of the operations of the computer in determining the degree of degraded performance of the aircraft;

FIG. 6 is a block diagram illustrating a second operation of the computer in determining the maximum safe speed of the aircraft;

FIG. 7 is an enlarged view of the EPR indicator shown in FIG. 1;

FIG. 8 is an enlarged view of the air speed indicator shown in FIG. 1;

FIG. 9 is a sample display shown in the display panel shown in FIG. 4 when the load function of the computer is actuated;

FIG. 10 is a sample display of the display panel shown in FIG. 4 when the computer is in the cruise mode;

FIG. 27 is a chart indicating what data symbols are displayed on the display panel during each schedule of each mode of the computer.

DETAILED DESCRIPTION OF THE PREFERRED EMBODIMENT

Figure 1:
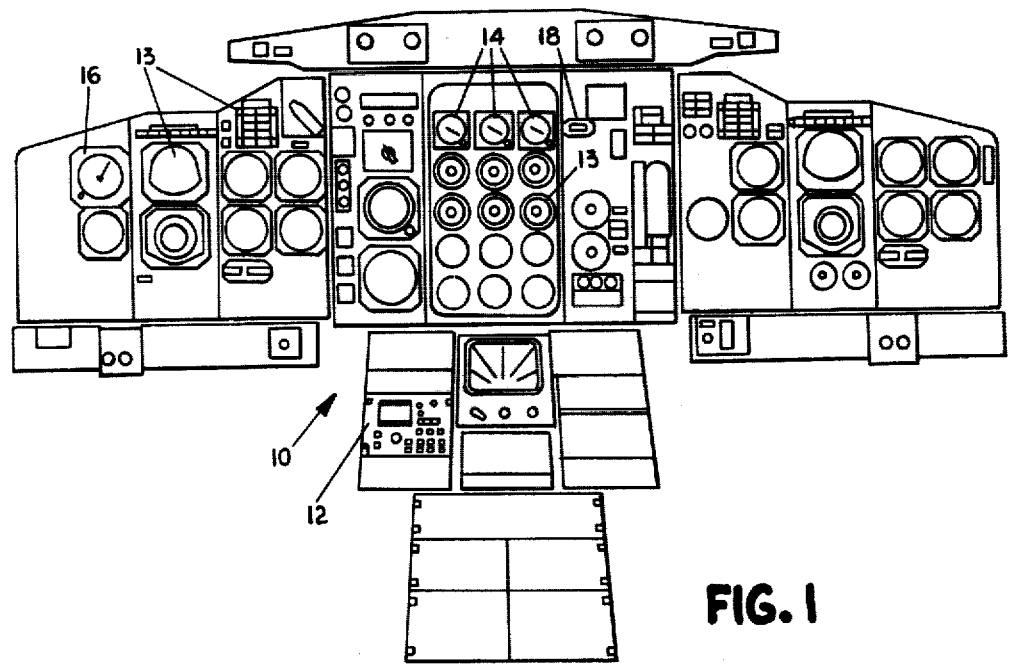
FIG. 1 is a perspective view of a pilot's cockpit equipped with an embodiment of the invention.
Figure 2:
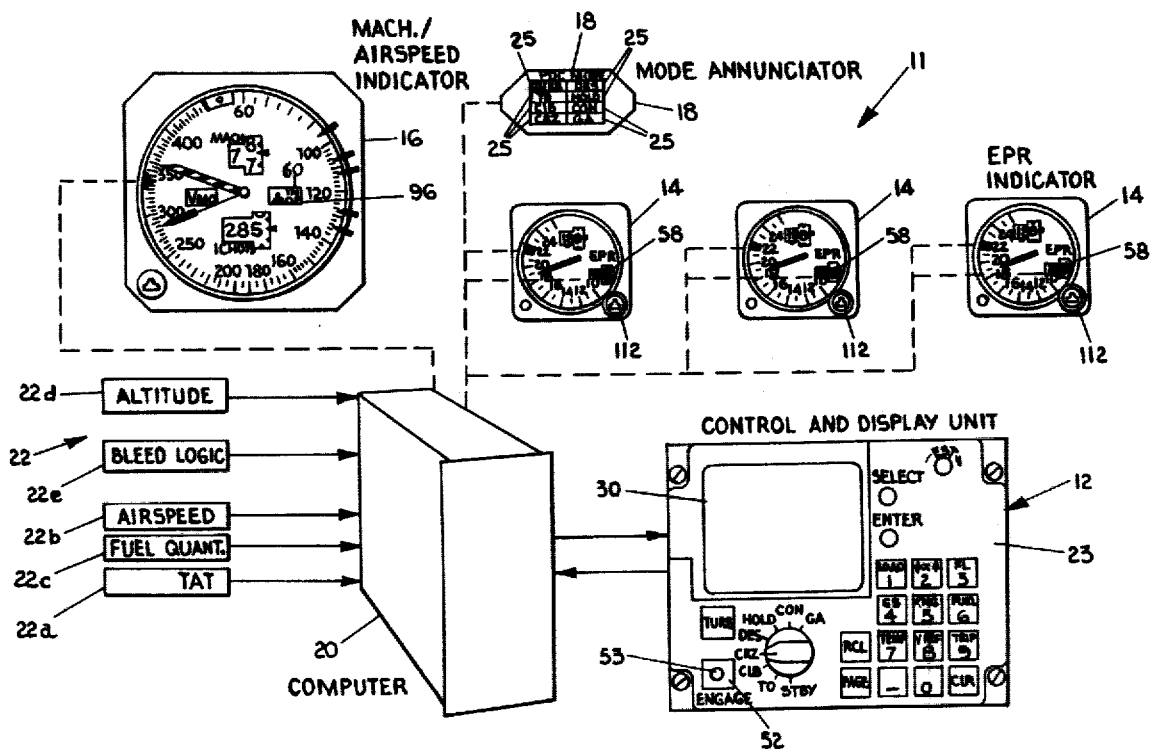
FIG. 2 is a block diagram of the embodiment of the invention shown in FIG. 1.

Referring now to the drawings, particularly FIGS. 1 and 2, a performance data computer system 11 has a control and display unit 12, EPR indicators 14, mach-/air speed indicator 16, and the mode anunciator 18 operably connected to a computer 20. A pilot's cockpit 10, having many controls and indicators 13, has mounted thereon components, namely, the control and display unit 12, the engine pressure ratio indicators 14, the mach/air speed indicator 16, and mode anunciator 18.

The computer 20 is connected to various input sensors 22, namely a total air temperature indicator 22a, an air speed sensor 22b, fuel quantity sensor 22c, altitude pressure sensors 22d, and bleed logic sensors 22e. The computer 20 is also receptive to input signals supplied from the control and display unit. The sensors 22 are located at conventional points about the aircraft to most accurately determine the desired parameters.

As shown in FIG. 3, the control and display unit 12 has a casing 23 which houses a mode selector 24, a display panel 30, enter button 50, engage button 52, turbulence key 82, light 53, and keyboard 40 comprising a plurality of keys. Key (Load-1), Key (↓ x ↑ -2), Key (F1-3), Key (GS-4), Key (RNG-5), Key (Fuel-6), Key (Temp-7), Key (V-Ref-8), key (Trip-9), key (−), key (0), recell button 26, page button 28, and clear button 38 comprise keyboard 40.

As clearly shown in FIG. 4, the computer provides output signals to the mode annunciator 18 and display panel 30. The other buttons and keys provide input signals to computer 20.

Referring now to FIGS. 2 and 7, mach air speed indicator 16 has a dial 83 graduated in knots to indicate air speed. An air speed needle 84 is rotatably mounted to point to the graduation responsive to the signal produced by the air speed sensor 22b. A window 86 has visible numbers 88 which indicate the mach of the aircraft. A second window 90 has visible numbers 92 indicating the air speed corresponding to the position of needle 84. A striped needle 99 is positioned corresponding to the maximum operating velocity Vmo. A third window 95 displays a Vmo flag when the striped needle 99 is inoperative. A driven bug 56 is rotatably mounted to the indicator to follow the periphery of dial 83 to a desired air speed as calculated by computer 20. In addition, the bug 56 is operably connected to a manual bug control 94 which can be operated by the pilot to manually position bug 56 to any desired position.

A visible bug flag 60, positioned in window 96, as shown in FIG. 2, indicates whether the driven bug is being driven by the real parameters of the aircraft, namely when the turbulence mode, take off mode, and go-around mode are engaged as described below. The bug flag 60 is automatically movable to second position away from window 96 when real variables control the bug 56.

Referring now to FIGS. 2 and 8, EPR indicators 14 each have a graduated dial 100. A needle 102 is rotatably mounted to the dial 100 for indicating the actual EPR. In addition, a window 104 displays a number 106 indicating the actual EPR. A driven bug 54 is operably connected to the computer 20 and driven thereby to indicate the desirable EPR setting. In addition, a window 108 displays the desired EPR number 110. A manual control knob 112 is operably connected to numerals 110 and EPR bug 54. The pilot can manually move knob 112 to manually set the bug 54 and setting number 110. An EPR flag 58, shown in FIG. 2, is displayed when the EPR bug and setting are not operated by the computer 20, namely when the descent mode, and turbulence mode are engaged as described below.

The mode selector 24 can be positioned to any one of eight operable positions. The computer detects which position mode selector 24 is in and reacts accordingly as described below.

Each mode may have various pages corresponding to different schedule options. The recall button 26 and page button 28 are operably connected to the computer. The recall and page buttons are actuated to actuate the computer for producing a selected flight schedule in any of the various modes indicated by the mode selector. Actuation of the page button 28 causes the display panel 30 to display the next schedule option while actuation of the recall button 26 recalls the previous schedule option.

The plurality of symbols on the keys of the keyboard 40 indicate the performance function the particular key actuates. The performance functions automatically perform certain calculations, such as time remaining, ground speed and distance solutions, the best cruise altitude and reference landing speed. To obtain a performance function, the operator merely presses the desired indicated key.

The display panel 30 produces a display according to the mode selected, the page of each mode selected or the performance function selected. As illustrated in FIGS. 9 and 10, the display panel 30 has various abbreviated symbols 32 displayed for easy reading. FIG. 9 illustrates the display panel when the load function is actuated. FIG. 10 represents another display when the cruise mode is selected and the long-range cruise (LRC) schedule is selected.

For each symbol, a number 33 represents the quantity for the representative symbol 32. Many of the symbols have as asterisk 31 which indicates that a number 33 may be supplied by the pilot. One of the symbols 32 is also marked with a caret 36. The caret 36 represents that this symbol 32 may also be supplied by the pilot and the system is set to receive the requested number. In order for the computer 20 to receive the requested data, the pilot merely presses clear button 38 and pushes the correctly numbered key of keyboard 40. To enter another symbol 32 marked with an asterisk 31, the pilot merely pushes the select button 34 which moves the caret 36 to a next asterisk 31 and replaces the previous careted line with an asterisk. The pilot then pushes the clear button 38 and the correct keys 42 for that symbol 32.

Referring back to FIG. 2, the mode annunciator 18 has light indicators 25 corresponding to each of the mode positions of the mode selector 24. The light indicators 25 indicate which mode is controlling both the EPR and air speed bugs 54 and 56. If the actuated mode annunciator light 25 does not correspond to the mode selector position, the engage light 53 will be actuated to indicate that the mode displayed on display panel 30 is not the mode which is controlling the bugs 54 and 56.

After the careted information is loaded, the engage button 52 is pressed to deactuate the light 53 and drive the EPR and air speed bugs 54 and 56 to the indicated positions.

The various modes and functions of the system 11 will now be described in terms of a pilot's operation thereof. Referring now to FIGS. 9, 10, and the chart illustrated in FIG. 27, the display panel 30 does not overwhelm the pilot with much irrelevant data, but only displays essential data for the particular schedule or function being used at the time determined by the position of the mode key 24 and page and recall buttons 28 and 26, respectively. Only particular symbols 32 are displayed on the screen with the accompanying numbered values 33.

STANDBY MODE

When the mode selector 24 is in a standby position, the display panel 30 displays an appropriate indication that the computer is in the standby mode. The standby mode has three pages, only one page being displayed on the display panel 30 at any given time. The first page merely states that it is in the standby mode. Page two states the aircraft configuration in the type of engines that are being used on the aircraft. The third page is a self-test page which has the computer test itself to see if the programmed computer is programmed for the particular aircraft mode, and the jet engine model and the aircraft model are matched to the same parameters used in the programmed computer. The page three will show either a valid or invalid sign. If the self test shows a valid sign, the operator is ready to use the performance data computer system 11.

LOAD FUNCTION

The pilot's first step is to press the key (Load-1) which sets the computer in a load function which produces a display on display screen 30 as illustrated by FIG. 9. The various lines represent the requested information which is supplied by the pilot indicated by the accompanying asterisk 31 and caret 36. The first line (OAT°) is the outside air temperature at the airport. The pilot can supply either the temperature in Centigrade or Ferenheit. The pilot presses the select button until the caret is properly positioned at either the Centigrade or Farenheit line. He then presses the clear button 38 to clear any previous numbers and let the computer accept a new number. The caret 36 starts to blink, indicating that the line is ready for a numbered output. He then presses the keys of keyboard 40 to input the outside air temperature. The enter button 50 is pressed which allows the computer 20 to utilize the entered number in subsequent computations. The caret automatically drops to the next line with an asterisk which is the elevation of the destination (D→ELV). The pilot enters the elevation of the destination airport in the same manner by pressing the clear button 38, the correct numbered keys of keyboard 40, and the enter button 50. The same procedure is followed for the zero fuel weight (ZFW) and the reserved fuel (RSV) and the index.

The index is a number between 0 and 200 which determines the time dependent costs such as wages and overhead costs of being in the air as compared to the cost of fuel. The airline determines its own index for each flight and is changeable when wages change or when the cost of fuel changes. The airline may have the index number already entered so the pilot does not have to enter it.

If any of the factors are changed after being entered or if there was a mistake in punching the wrong numbered keys of keyboard 40, the error can be easily corrected by merely positioning the caret at the line to be corrected and pressing clear. The clear erases the previous number and sets the line for a newly entered number.

TAKE OFF

The mode selector is switched to the take off mode (TO) and the display panel 30 indicates the outside air temperature (OAT°) and the engine pressure ratios (EPR) for take off. The OAT° is asterisked (*) indicating the pilot may supply a differnt value than what was loaded during the load function. The recommended EPR is the EPR limit for the jet engines, automatically corrected for engine bleed air configuration.

Referring now to FIGS. 3, 7, and 8, the engage button 52 is pressed which actuates the EPR bug 54 on the ERP indicator 14. The EPR bug 54 corresponds precisely with the EPR indications that are displayed on the display panel. The mach bug 56 is driven to the standby position of 250 knots. The pilot manually sets the mach bug 56 through control knob 94 to his desired take-off air speed as obtained from sources other than the computer 20. During take off, the air speed flag 60 is displayed, indicating the air speed bug 56 is not dependent upon the various real parameters of the aircraft or air mass.

In addition, the mode annunciator 18 TO slot is illuminated to indicate the bugs are driven by the computer in take-off mode.

CLIMB

Figure 27:
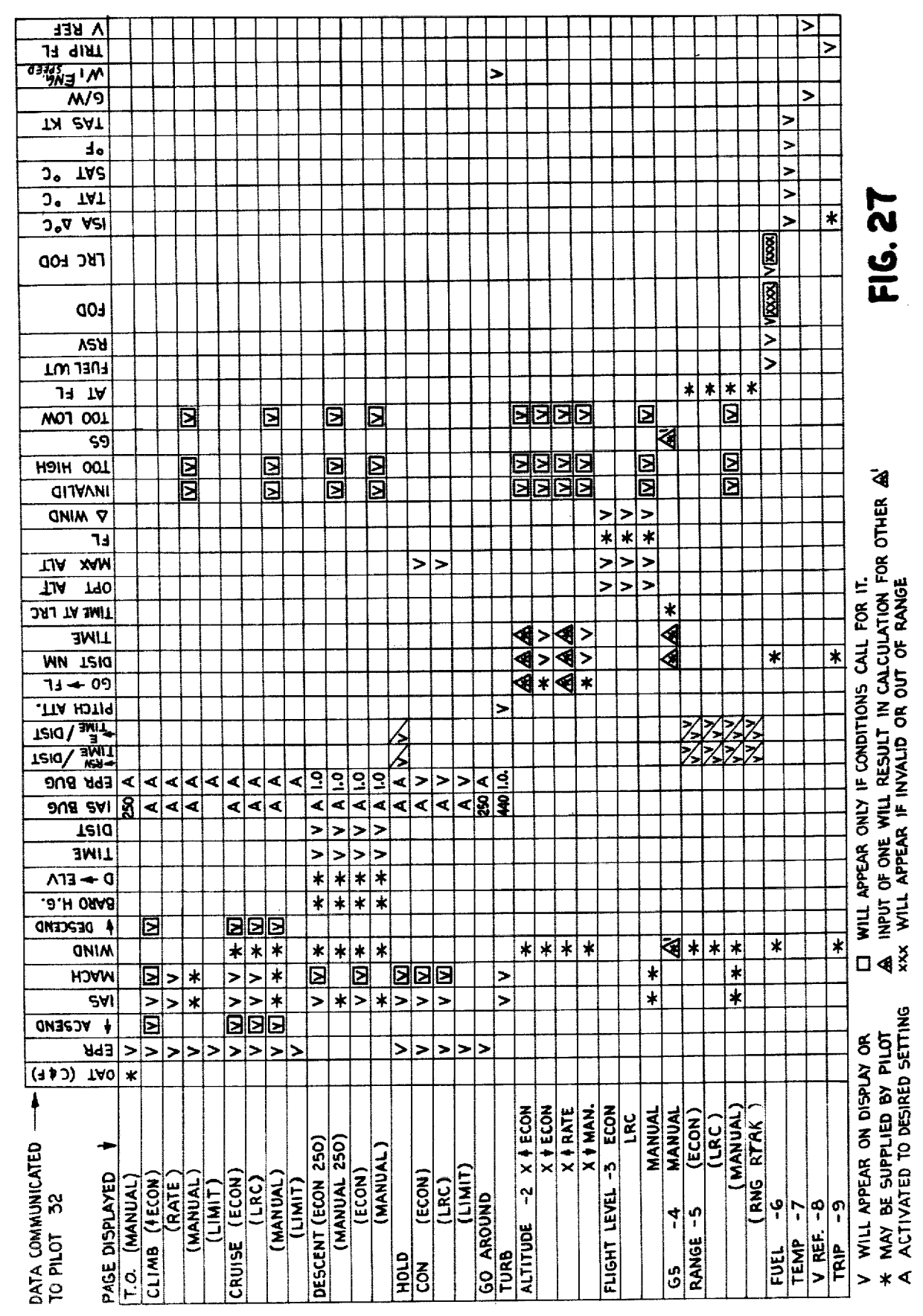

The mode selector 24 is positioned at the climb mode. The climb mode has four operable pages as indicated in FIG. 27, namely, the most economical climb (ECON), the maximum rate of climb (RATE), a manual climb (MANUAL) and an EPR limit climb (LIMIT). In the economical and rate climb schedules, the EPR limits for each of the jet engines and the recommended air speed (IAS) or mach are displayed. In the manual climb schedule, the air speed and mach are asterisked (*) which indicate that the pilot chooses his own values.

The EPR and mach bugs 54 and 56 remain in the previous take off position. The mode annunciator remains lit in the TO mode, and the engage light 53 is illuminated until the climb mode is engaged by the pressing of the engage button 52. At this time, the mach bug 56 and EPR bug 54 respond to the computer output signals for EPR and mach and move to the desirable climb positions corresponding to the displayed numbers on the display panel 30.

In the manual climb schedule, the air speed bug will follow the pilot supplied IAS until the aircraft reaches an altitude where the pilot-supplied Mach number corresponds to the supplied IAS at which time the air speed bug will move to maintain the pilot-supplied Mach number.

The economy climb schedule represents parameters which would achieve minimum cost, including the cost of fuel and any time dependent costs. If the index which appears when the load function displayed is zero, the economy climb equals the most fuel efficient climb.

CRUISE

When the mode selector 24 is in the cruise position, the recall and page buttons 26 and 28 can be actuated to display one of four cruises: an economy cruise schedule (ECON), a long-range cruise schedule (LRC), a manual cruise schedule (MANUAL), and an EPR limit schedule (LIMIT). In the economy and long-range cruise schedules, the wind component symbol (WIND) is asterisked which indicates that the wind factor can be supplied by the pilot. The wind factor can be either negative which indicates a head wind, or positive which indicates a tail wind. For entering a negative number representing a head wind, the clear button is pressed, the negative key ( − ) is pressed, and then the numbered keys are pressed in proper order. If the wind component is not entered, the wind component reads as zero (0) and the air speed (IAS), MACH, and ERP readouts are based on the zero (0) value. The wind component can also be computed automatically by computer 20 by using inputs from distance measuring equipment, inertial navigation system, or other system which provides a measure of ground speed known to those skilled in the art. The computer automatically produces signals which appear on the display screen as the recommended EPR, MACH and air speed (IAS) for the selected cruise schedule.

The engaged light 53 becomes illuminated until the engaged key 52 is actuated. When the engaged key 52 is actuated, the air speed, MACH, and EPR bugs, responsive to the computer output signals for the recommended IAS and EPR, move to the recommended settings.

Also appearing on the display panel 30 is an ascending or descending arrow 64, as indicated on FIG. 10, if and when the aircraft is flying more than 1500 feet below or above the optimum altitude. An ascending arrow tells the pilot to go up and a descending arrow tells the pilot to go down to reach the optimum cruise altitude.

In manual cruise as illustrated in FIG. 27 the pilot selects his own air speed (IAS) and MACH as indicated by the accompanying asterisk (*). The computer automatically produces the recommended EPR limit for the cruise mode.

TURBULENCE MODE

If, during the cruise mode of the flight, moderate to severe turbulence is encountered, the pilot presses a turbulence button 82 (TURB). Upon the pressing of button 82, the display panel 30 displays the pitch attitude and engine speed ($v_1$) necessary for the airplane to maintain the best airspeed for turbulence. The air speed bug automatically moves to a standby position if 440 KIAS and the EPR bug automatically moves to 1.0, the flags 58 and 60 both appear and mode annunciator 18 indicates the turbulence mode is engaged. If the turbulence key 82 is pressed again, the mode annunciator 18 goes blank, indicating that no mode is engaged and the air speed bug moves to 250 KIAS.

DESCENT MODE

The mode selector 24 can be positioned to the descent mode in which one of four pages can be displayed. The display pages are the economy 250, manual 250, economy and manual. The descent mode is used approximately 30 minutes from the landing destination to determine the optimum descent point. Each descent page displays the barometer measurement (BARO HG) which is asterisked (*). The BARO HG line automatically reads 29.92 unless the pilot inserts otherwise. The elevation of the destination (D→ELV) is automatically read out because it was supplied during the load function. If the destination elevation (D→ELV) is incorrect, the pilot clears and enters the new number in the usual manner. The wind component is also entered in the usual manner.

All the descent profiles are limited to mach 0.80 at a high altitude and the IAS display may be reduced from the entered value if the mach 0.80 is exceeded. The displayed IAS will vary and continually increase until the entered IAS is reached as long as mach 0.80 is not exceeded.

When in the economy schedule, the computer calculates the desired mach and air speed (IAS), the distance (DIST) from the destination in which the descent should commence, and the time it takes during the descent profile to reach the destination.

The economy 250 page discloses the same information as the economy page, except that it requires a slow up down to 250 KIAS at 10,000 feet; the TIME and DIST is computed with the 250 slow-up taken into account.

In the manual page, the speed is selected by the pilot and the TIME and DIST are automatically computed.

In the manual 250 page, the speed again is selected by the pilot, but the computer computes the TIME and DIST with the 250 slow-up at 10,000 feet taken into account.

All the four schedules assume idle thrust and speed brakes down. When the pilot reaches the geographical point at which descent should being, he presses the engage button 52. The air speed bug 56 moves to the recommended speed and the EPR bug and setting number 110 moves to 1.0 and is flagged inoperative by flag 58. The EPR at 1.0 indicates idle thrust.

HOLD MODE

If, per chance, the airport does not allow the aircraft to land either because of weather conditions, traffic back ups, or other reasons, the mode selector 24 can be positioned at the HOLD mode at which the suggested holding speed IAS/MACH and suggested EPR are displayed for the present altitude so that minimum fuel is consumed. The HOLD mode assumes that the gear and flaps are retracted. The hold display also indicates the time left before the reserve fuel (→RSV/TIME) must be used and the endurance time (→E/TIME) before the total amount of fuel in the aircraft is consumed. The engage light 53 is lit until the engage button 52 is pressed and the air speed and EPR bugs are moved to the suggested settings as displayed on the display panel 30. The holding schedule is based on a holding pattern with one minute legs. Longer patterns with fewer turns will save more fuel and, therefore, the reserve fuel time and the endurance time are conservative.

GO AROUND MODE

The mode selector 24 can also be in a GO AROUND mode in which the EPR limits are calculated and displayed for the ambient conditions and the bleed configuration. When the GO AROUND is engaged, the air speed bug moves to 250 KIAS and is flagged inoperative by flag 60. The EPR bug moves to the go around EPR limit. The GO AROUND may be selected during the final approach phase to assist the pilot in setting the throttles in the event of a go-around.

MAXIMUM CONTINUOUS THRUST MODE

The mode selector also has a maximum continuous thrust (CON) position for use when one engine is inoperable and the aircraft must go down to a lower altitude. The CON mode has three pages, ECON, LRC and LIMIT, each which displays the EPR limits for the ambient condition and bleed configuration.

When in the ECON page, the computer calculates the speed (IAS) which gives the longest drift down to the newly calculated maximum altitude (MAX-ALT).

When in the LRC page, the computer calculates the speed (IAS) which renders the best LRC performance while drifting down to a newly calculated maximum altitude (MAX-ALT).

When in the LIMIT page, the air speed bug moves to 250 KIAS and is flagged inoperative by flag 60.

PERFORMANCE FUNCTIONS

Besides the various modes, the performance data computer system 11 has various performance functions which are operable during several of the modes and calculate certain specific data for the pilot's information.

FLIGHT LEVEL FUNCTION

The flight level key (FL-3) can be actuated to determine the optimum altitude for the cruise mode. The flight level function has three pages corresponding to an economy flight (ECON) and long-range cruise flight (LRC) and the manual flight (MANUAL). The function derives the optimum and maximum altitudes for the desired cruise schedule at the desired mach air speed and EPR.

In addition to the maximum and optimum altitude for each of the selected flights, the flight level display also includes flight level designation (FL) and the wind trade or change of wind (ΔWIND) designation. The flight level (FL) is the level at which the pilot is flying or wishes to fly and can be set by the pilot as indicated by the asterisk in FIG. 27. The display will show a caret 36 next to the FL value. The pilot enters the flight level (FL) number in the usual manner. The computer 20 receives the flight level information and utilizes the existing parameters to indicate the wind trade (ΔWIND) needed between the present real altitude and the flight level designation in order for the flight to be equally efficient in the economy, long range or manual cruise schedules.

If the pilot knows the wind component at a different altitude, he can determine if it is possible to climb or descend to the different altitude to achieve equally efficient flight profiles as the present altitude under the present wind condition. If the wind trade (ΔWIND) component is negative, that means that the aircraft can accept that much less tail wind or more head wind without affecting the fuel mileage. If the wind trade (ΔWIND) is positive, the pilot must have that much more tail wind or that much less head wind to maintain the same fuel mileage as the present flight altitude.

This function is extremely useful if the optimum altitude is unavailable due to traffic patterns or air traffic control instructions where a choice of alternate flight levels can be investigated knowing the wind patterns at each level.

In the manual page of the flight level, the MACH and air speed (IAS) is also displayed at which the present mach and air speed is initially displayed. The pilot, if wishing to display other schedules, can clear the mach and air speed in the usual manner and insert selected mach and air speeds. If the mach and air speed are too great at which the flying altitude must be higher than the maximum altitude allowed, the flight manual display will automatically display the invalid (INVALID) indication and indicate that the mach and air speed are too high (TOO HIGH). The pilot can then clear the MACH and air speed (IAS) and insert lower figures.

ALTITUDE INTERCEPT FUNCTION

If the pilot decides to change altitudes, he can press the altitude intercept key ( ↓ X ↑ -2). The altitude intercept function key has an economy climb, an economy descent, a maximum rate of climb, and a manual descent page. The altitude intercept key, when actuated, causes the display panel 30 to display the desired flight level (GO→FL), the distance in nautical miles (DIST/NM), and the time elapsed (TIME) to achieve the flight level and the wind component involved. For a climb to a higher altitude, the GO→FL, DIST/NM, TIME and WIND symbols are all asterisked (*). One enters the wind component and any one of the three GO→FL, DIST/NM, and TIME values. The computer receives the one symbol and will determine the other two symbols utilizing the aircraft parameters and air mass parameters. For example, if one wishes to fly at 31,000 feet from a present 15,000 feet, he enters the new altitude on the GO→FL line and the display screen will automatically display the TIME and DIST/NM values the aircraft will take to achieve the new level following the most economical or maximum rate schedule.

For another example, if the pilot wishes to find out what level he may obtain within 40 miles, he enters 40 under DIST/NM and the display screen displays the level which can be achieved within that distance in a certain amount of time.

As with the climb mode and the descent mode as discussed above, the climb intercept calculations assume maximum EPR and the descent calculations assume idle thrust.

GROUND SPEED FUNCTION

The ground speed key (GS-4) can be used while in the CRUISE or CON mode. The ground speed function, when actuated, displays the wind component (WIND), the distance to a particular geographical point (DIST/NM) with time elapsed (TIME) to pass the point at the indicated ground speed (GS) and also the time elapsed (TIME AT LRC) to reach the distance if a long-range cruise speed schedule is followed. The GS value is automatically entered from calculations of the True Air Speed (IAS) plus the wind component (WIND). The wind component is carried over from the CRUISE or CON mode. If the wind component changes or the pilot would like to find out the time or distance at a different ground speed, he can enter the desired ground speed in the usual manner. The distance (DIST/NM) and time (TIME) symbols are dependent values and either may be entered to calculate the other. For an example, if at a certain air speed (GS) the pilot wishes to find out where he will be in 25 minutes, he enters 25 in the time line and the computer calculates the distance and produces an output symbol which is displayed on the display panel on the DIST/NM line and the display will read out the elapsed time (TIME) it takes to achieve the distance with the speed shown.

RANGE FUNCTION

The range key (RNG-5) is operable in the CRUISE, CON or HOLD mode. The range key (RNG-5) allows the pilot to obtain information on the endurance and range capability of the aircraft under the real and ambient conditions of the aircraft. The range function has four operable schedules: The economy (ECON), long-range cruise (LRC), manual and optimum holding altitude (RNG RTRK).

Both the economy (ECON) and long-range cruise (LRC) schedules will determine the time and distance (→RSV TIME/DISTANCE) left before the reserve fuel must be used and also the total amount of endurance time and distance (→E TIME/DISTANCE) before the total amount of fuel is consumed at a particular altitude with a particular wind component. The flight altitude (AT FL) displayed is initially the present altitude carried over from a particular CON, CRUISE, or HOLD mode.

If the pilot wishes to investigate several speed schedules, he can go to the manual schedule by pressing the page button. In the manual schedule, the present mach and air speed (IAS) are indicated with an asterisk (*) indicating that the pilot may plug in his own desired MACH or AIR SPEED (IAS) along with any desired flight altitude (At FL). If the MACH or altitude (AT FL) is outside the aircraft's mach or altitude limits, the computer will cause an output signal to display an INVALID and TOO HIGH signal for the designated flight altitude (AT FL) or MACH. The pilot then clears and enters a lower mach or altitude in the usual fashion.

The optimum holding altitude page (RNG-5) shows the time left (→RSV/TIME) until reaching the programmed reserves and also the total time left (→E TIME) before all fuel is consumed at any designated flight level. The pilot can investigate various flight altitudes by just merely plugging in a selected flight altitude and determining which altitude gives him the greatest amount of time.

Another range schedule can be inserted into the computer which indicates the range left when one of the engines is malfunctioning or is completely out.

FUEL FUNCTION

Another function key is the fuel key (Fuel-6) which when actuated derives the estimated fuel over the destination (FOD). The display panel 30 displays the present fuel weight (FUEL WT), the wind component (WIND→) used in the calculation which can be changed as indicated by the asterisk (*) and the distance to the destination or any way point (DIST/NM). The reserve fuel weight (RSV) which was entered in the load mode is also displayed. If the reserve fuel weight was not loaded, the line requests that you "load data". The computer automatically uses real variables to determine the fuel over the destination (FOD) following the last speed schedule selected in the CRUISE mode or the present aircraft speed if the mode selector 24 is in the CON mode. The total fuel remaining over the destination or any way point when using a longrange cruise schedule (LRC-FOD) is also calculated and displayed. If the computer determines that the fuel over the destination (FOD) or (LRC-FOD) will be zero or less, a line of "x's" on the FOD and LRC-FOD lines appear to indicate that the flight plan must be altered since the distance cannot be reached.

The FOD and LRC-FOD readouts are conservative calculations since the calculations do not take into account idle thrust during descent but assumes that cruise schedules, which are less fuel efficient, will be used up to the exact point of destination.

TEMPERATURE FUNCTION

The temperature function key (TEMP-7) when used indicates the total air temperature (TAT), static air temperatures (SAT °C & °F), and true air speed in knots (TAS KT), and the International Standard Atmosphere Deviation (IASΔ°C.). If the TAS KT is less than 100, "x's" are displayed in all temperature outputs, except for the TAT.

APPROACH SPEED FUNCTION

The approach speed function key (VREF-8) displays the referenced speeds for landing and the current gross weight and are computed for the flaps positioned at various angles as denoted on the display.

SHORT TRIP PLANNING FUNCTION

The trip planning function key (TRIP-9) determines the best altitude for short trips less than 300 nautical miles. When the trip function (TRIP-9) key is actuated, the display panel 30 discloses a DIST/NM which is asterisked (*) so that the pilot feeds in the proposed trip length, the wind component (WIND) which is also supplied by the pilot, and the ISAΔ°C. which is the forecasted ISA temperature deviation at the approximate cruise flight level. The computer calculates the recommended flight level (TRIP FL) which will allow a five minute cruise segment so that the flight profile approximates a parabola.

After the performance functions have been used, the pilot merely pushes the recall button 26 to retrieve the last shown mode display.

COMPUTER DERIVATION OF DESIRED OUTPUTS

The computer 20 plays a vital role in determining the approximate output signals from the input signals from the various input sensors 22. In order to correctly determine the output signals in the various modes, the computer must be loaded with permanent data corresponding to the particular aircraft engines and aircraft models. Accordingly, the computer must be provided with a memory sufficiently large to store the necessary data. For this purpose, a storage bank sufficient to store 20,000 words should be adequate.

CALCULATIONS OF VARIOUS SPEEDS

Referring to FIGS. 11 through 26, the computer uses the appropriate loaded permanent information to calculate the various speeds for the climb, cruise, descent, hold and continuous modes in the various schedules in each mode. All of this permanent information is derived and loaded into the airborne computer by conventional means.

Figure 11:
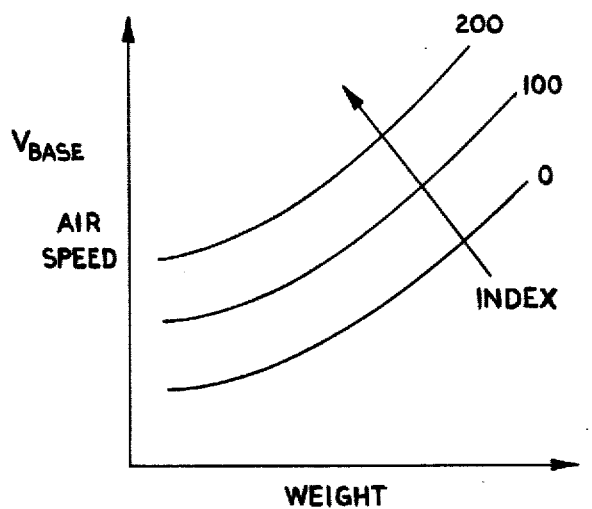
FIGS. 11 through 26 are graphs illustrating various data which are permanently loaded within the computer.
Figure 12:
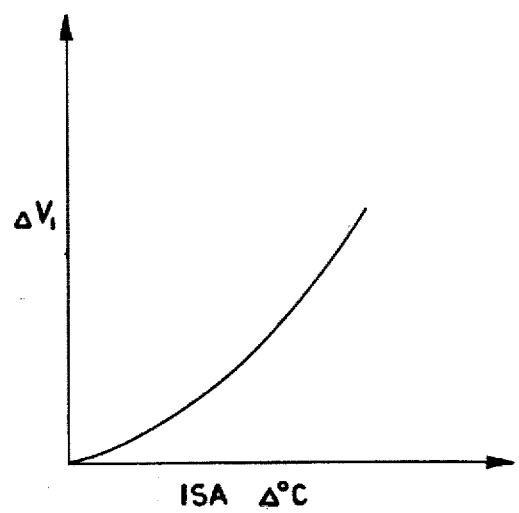
Figure 13:
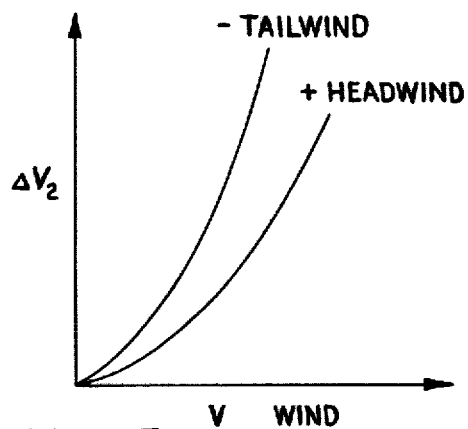

In calculating the most economical climb mode speed, the computer has loaded therein, as illustrated in FIG. 11, various desirable air speeds corresponding to the weight of the airplane and the cost index. By knowing the weight of the loaded airplane and the cost index, the computer can pick the appropriate base speed, as shown in FIG. 11. However, the most economical climb speed also must take into account the change of speed $\Delta V_1$ due to the International Standard Atmospheric Temperature differential, as illustrated in FIG. 12, and the change of speed $\Delta V_2$ due to the effect of the wind velocity on the airplane, as illustrated in FIG. 13. The most economical climb speed is the summation of the base speed plus the two changes in speed as illustrated in FIG. 12 and FIG. 13.

Figure 14:
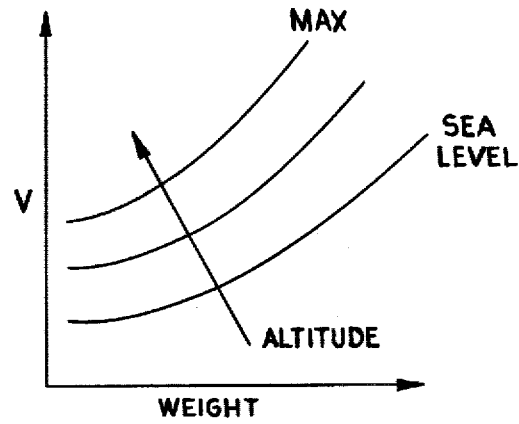
Figure 15:
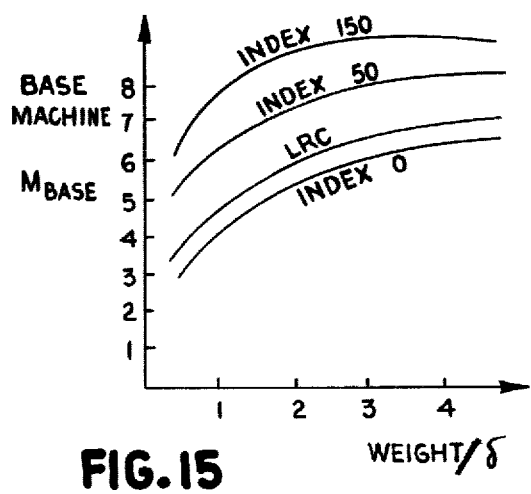

To derive the maximum rate of climb, the computer is loaded with base velocity information of the appropriate speed depending upon the loaded weight of the aircraft and the altitude of the aircraft as illustrated in FIG. 14. The base velocity is modified by the change in velocity due to the difference from the International Standard Atmospheric Temperature (FIG. 12). As is well known, if one follows the maximum rate of climb speed, maximum fuel efficiency is achieved.

For the manual page in the climb mode, the pilot picks a speed and the charts, FIGS. 11 through 14, are not used to calculate the correct speed.

Figure 16:
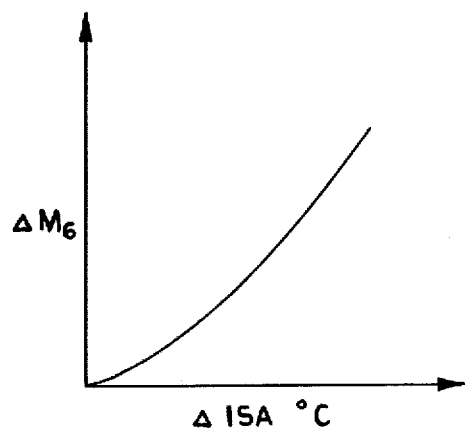

Once the pilot goes in the cruise mode, a different set of permanent data is used to figure out the long-range cruise mach or the most economical cruise speed. The computer is loaded with base speed information as graphically set forth in FIG. 15. A base mach is dependent on the weight divided by a pressure ratio $\delta$ and the index factor. The pressure ratio $\delta$ is equal to the present pressure altitude divided by the pressure altitude at sea level. Once of the curves set forth in FIG. 15 corresponds to the long-range cruise curve. The most economical mach is calculated by adding the base mach derived from FIG. 15 and adding various correction mach factors. One correction factor $\Delta M_6$ is due to the deviation of the temperature from the standard day temperature as shown in FIG. 16. A second correction factor $\Delta M_5$ is derived from a two-step procedure.

Figure 17:
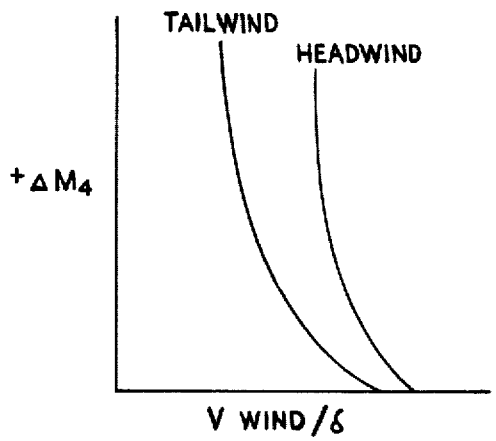

Firstly, as shown in FIG. 17, a delta mach sub four ($\Delta M_4$) is dependent upon the velocity of the wind with respect to the aircraft divided by the pressure ratio $\delta$. The second correction factor, delta mach five ($\Delta M_5$) is then calculated. $\Delta M_5 = Vw \times \Delta M_4/00$. Vw equals the velocity of the wind. The most economical mach (Mecon) then is calculated:

$$M_{econ} = M_{base} + \Delta M_6 + \Delta M_5$$

To calculate the mach for the long-range cruise schedule, the same process is involved. The chosen base mach will be on the LRC curve in FIG. 15.

As with the manual climb speed, if the manual cruise speed is picked, the use of the various speed curves is unnecessary.

Figure 18:
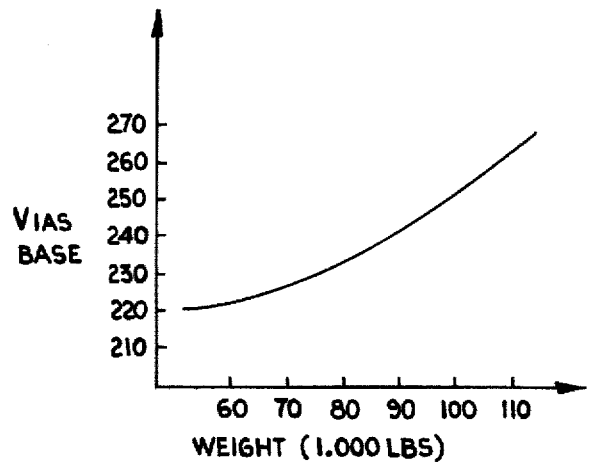
Figure 19:
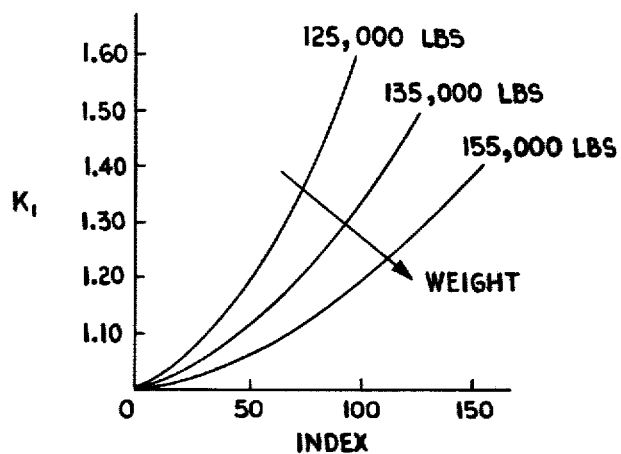
Figure 20:
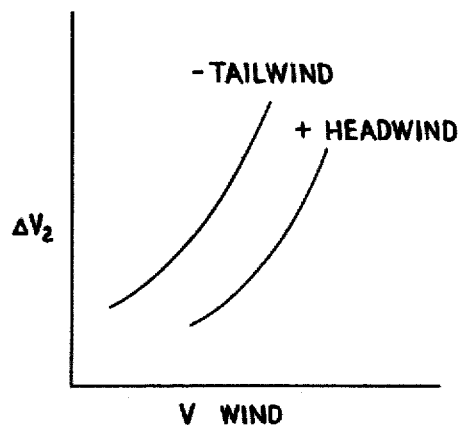

Referring now to FIGS. 18, 19 and 20, the most economical descent speed ($V_{econ}$) can be computed. FIG. 18 represents an optimum descent speed curve which is dependent upon the weight of the aircraft. The most economical descent air speed ($V_{econ}$) is the optimum descent speed ($V_{opt}$) plus a correction factor $\Delta V_2$, which is dependent upon the velocity of the wind, as shown in FIG. 20, times a correction factor K, as illustrated in FIG. 19, which is dependent upon the cost index and the weight of the aircraft. So the most economical descent speed is:

$$(V_{opt} + \Delta V_2) \times K.$$

Of course, when the manual speed schedule is followed, the pilot merely picks his own speed.

When the Econ 250 schedule is followed, the same data is used, except that there is an acceleration or deceleration correction at the ten thousand altitude. The pilot merely flattens his aircraft out at ten thousand feet and slows down to the 250 slow up mach indication and then continues his descent downward to land.

The holding speed in the hold mode is a speed for allowing maximum endurance rather than for any fuel or time efficiency; therefore, no wind correction is necessary. An equation within the computer can calculate the maximum endurance mach $M_t$ as follows:

$$M_t = Wt/(K_f \times \delta)$$

wherein Wt is the gross weight of the aircraft, $K_f$ is a constant depending only upon the model of the aircraft and aircraft engine, and $\delta$ is the pressure ratio of the present altitude over the sea level altitude pressure.

When an engine goes out, the pilot switches to the continuous mode which can calculate his drift down air speed to provide for an air speed for longest drift down to go down to a lower altitude. The computer has loaded therein an equation:

$$M_{DD} = K_2 \times (Wt)/\delta$$

where $K_2$ is a constant corresponding to the aircraft engines and aircraft model. To obtain a long-range cruise speed with an engine out, the computer looks to charted information similar to FIGS. 15 through 17, but with different curves supplied and uses the same summation process as for the regular long-range cruise speed schedule in the cruise mode.

DETERMINATION OF EPR AND EPRL

Figure 21:
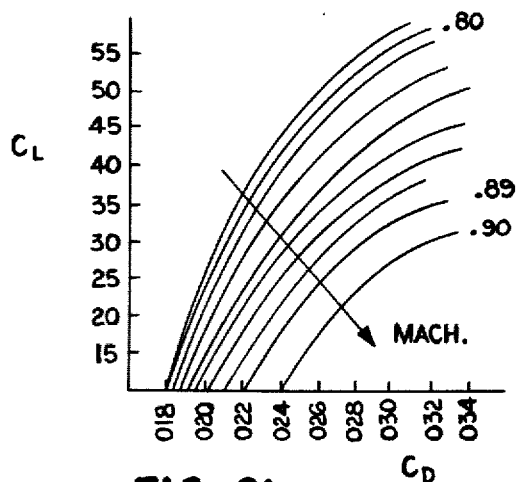

When in the cruise mode, the computer calculates the required EPR to obtain the desired mach by computing the total drag and total thrust of the airplane. The computer first calculates the lift co-efficient $C_l$ from equation:

$$C_l = Wt/(S \times C_2 \times 8 \times M^2)$$

where Wt is the gross weight of the aircraft, S is the surface area of the wing, and $C_2$ is the constant depending upon the aircraft model and engine. Permanent data, as illustrated in FIG. 21, loaded into the computer can determine the drag coefficient $C_D$ depending on the lift coefficient $C_l$ value and mach. The total drag D of the aircraft is then calculated by equation:

$$D = C_D \times C_2 \times M^2 \times \delta \times K_N \times S$$

where $K_N$ is a drag modification factor which is a sum of various drag factors due to antennas, the position of the low pressure tires and other various operable instruments on the plane which affect the drag of the airplane. Once the total drag is found, the total thrust is known since in cruise the drag and thrust are equal but opposite forces. The total thrust is then divided by the number of engines to find the thrust per engine. The conversion of thrust to EPR requires a set of five basic mach versus thrust curves for the selected cruise mach with different values of EPR set at 1.2, 1.6, 2.0, 2.4 and 2.8. A set of five correction curves for delta thrust ($\Delta F$) also is computed for each of the above-mentioned EPRs. An EPR required is then equal to a polynomial equation to the fourth order of the thrust with five constants. The solution is solved by a curve-fit technique implemented within the system. A technique may be a closed form solution to a quadratic or a least squares curved fit to a quadratic. Such a process shall be used which minimizes execution time and maintains the accuracy requirement of the system therein.

The EPR limits are calculated in the same fashion used in conventional TAT/EPRL systems.

COMPUTER DERIVATIONS OF THE VARIOUS FUNCTIONS

The functions, however, determine other performance profile outputs such as optimum altitude, maximum altitude, distance and time it takes to change flight altitudes, the wind trade at two different altitudes and the range and fuel over destination. To do this, the computer has to have certain additional permanent data stored therein so that the computation of the various outputs can be derived.

FLIGHT LEVEL FUNCTION COMPUTATION

Figure 22:
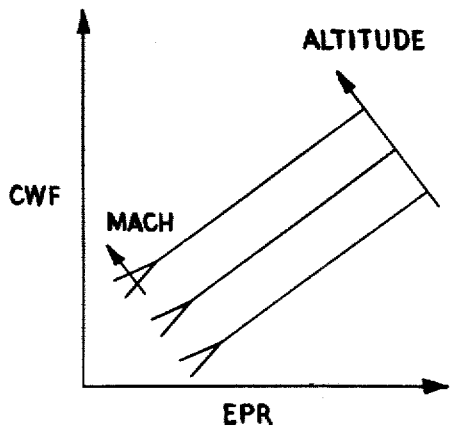
Figure 23:
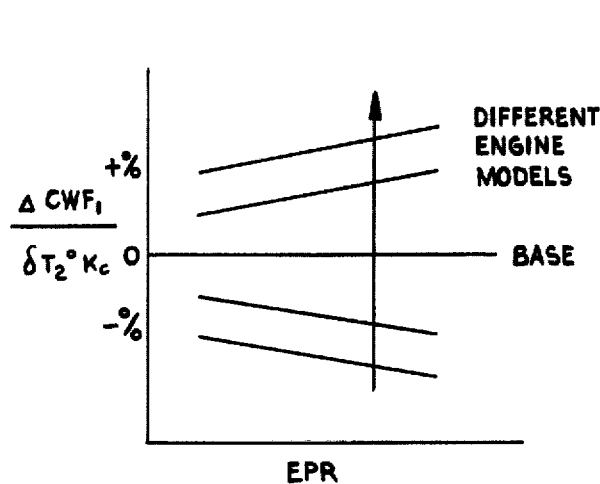

One of the more difficult functions is the flight level function in which the optimum altitude, maximum altitude and wind trade are displayed. To evaluate these outputs, the EPR required and the EPR limits must be calculated according to the above-described methods. In addition, the fuel mileage must also be found. To calculate fuel mileage, the fuel flow is calculated. Referring to FIG. 22, a base calculated fuel flow (CWF) calculated in pounds per hour is dependent upon the EPR, altitude and mach. A factor $\Delta CWF_1/(\delta T2 \times K)$ is then computed from stored data as illustrated in FIG. 23 which shows the plus or minus percentage based on the aircraft engine types and is dependent upon the EPR.

Figure 24:
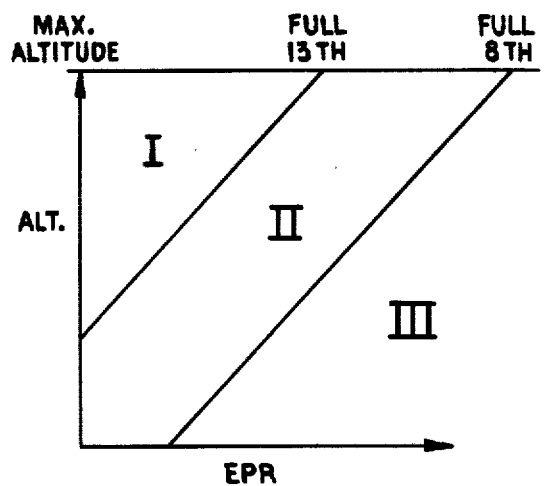
Figure 25:
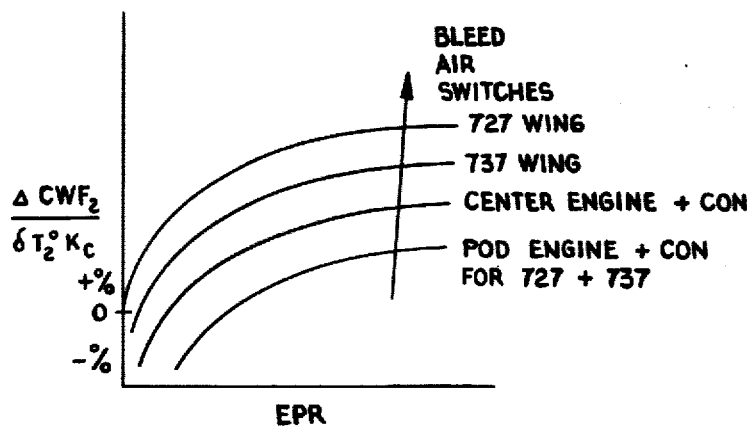

At FIG. 24, a bleed cross-over chart is used to determine whether the airplane's EPR and altitude point lies within region 1, 2, or 3. If the point lies within region 1, the factor $\Delta CWF13$ is calculated which is dependent upon the EPR and altitude. If the point is within region 3, another factor $\Delta CWF8$ is calculated also depending upon the EPR and altitude. If the point lies within region 2, the computer interpolates between the two factors $\Delta CWF13$ and $\Delta CWF\,8$ to obtain a $\Delta CWF_2$ factor. A third factor, $\Delta CWF_3$ is calculated by adding up all applicable curve values referring to FIG. 25, each curve represents one EPR bleed-off switch. $\Delta CWF$ is the summation of the curves depending upon the EPR values. A fourth factor, $\Delta CWF_4$ depends on EPR and compensates for the automatic stage bleed off on some particular models of engines. If the particular model does not have it, this factor is left out in the calculations. A fifth factor $\Delta CWF_5$ dependen-upon the EPR is added if the engine surge bleed valve position is open. The computed fuel flow in pounds per hour is then as follows:

$$WF_c = CWF_{base}\left[1 + \sum_{M=1}^{4} \frac{CWF_n}{\delta t2 \times K_c} \times \delta_{t2} \times K\right]$$

$$\text{where: } \delta t2 = \frac{P_{t2}}{P_{t1}} \times (1 + 0.2M^2)^{3.5} \cdot \delta_A$$

where $\delta$ is the altitude pressure ratio and $P_{t2}/P_{t1}$ is dependent upon the EPR and different values of it are stored within the computer and $K_c$ is a factor depending upon the temperature. For each engine model, a minimum fuel flow $WF_{min}$ is needed and stored in the computer. $WT_c$ and $WF_{min}$ are compared and the larger value is used for future calculations. Once the fuel flow is known, the fuel mileage can be calculated by the equation: FM=TAS/WF where FM equals the fuel mileage, TAS is the true air speed and WF is the flow of the fuel in pounds per hour.

Figure 26:
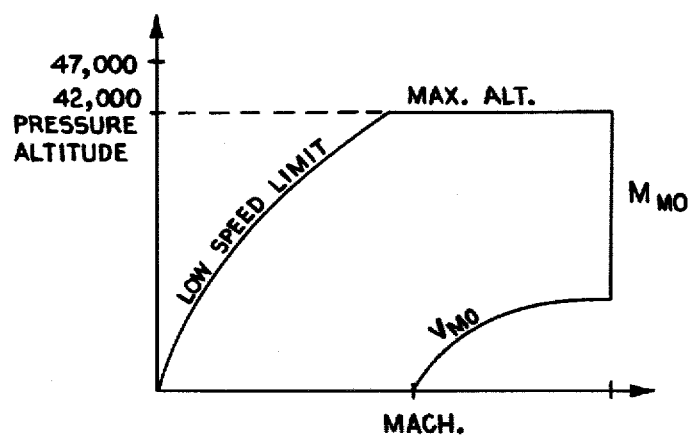

To obtain the optimal altitude, the computer calculates the fuel mileage vs. the altitude at five specific levels, ranging from 0 to maximum certified altitude; or if the certified span of altitudes of the aircraft is less for a specific mach, the values range from the certified minimum to the certified maximum for the specific mach. For calculating the range, permanent data as illustrated in FIG. 26 is loaded into the computer. The graph in FIG. 26 outlines the certified altitudes and mach for the aircraft. For each level, the necessary fuel consumed or burned to obtain the higher altitude is added in by the computer calculating in small increments the fuel flow during the climb so that the correct gross weight of the aircarft is being used to calculate new higher altitudes. The computer then interpolates between the five altitudes and finds the derivative of fuel mileage v. altitude. Where the derivative is zero and the approximate optimum altitude is found, the computer then takes a narrower range of altitudes extending from below to above the approximate optimum altitude and recomputes the five different altitudes within the narrower range. A second derivative is found, and a third range of altitudes is calculated. The derivative from the third range is then calculated and the optimum altitude corresponding to the third derivative is displayed on the display panel.

The calculated fuel mileage at the present altitude is compared to the calculated fuel mileage at the selected altitude and a wind trade factor, Δ WIND, is calculated therefrom to make up the difference between the two fuel mileage ratings.

ALTITUDE INTERCEPT FUNCTION COMPUTATION

The altitude intercept function displays the distance and time it takes to either ascend or descend to a different atltitude. The distance and time and new altitude intercept is based upon the difference between thrust and drag where the difference between the two is a function of the rate of climb or descent. The ascent intercept calculates the fuel burn in small 2,000 foot increments whereby the successive re-calculation is made using the new weight of the aircraft, a new mach and possibly different air temperature deviation. Each increment is calculated as follows:

$$DELTA\ T = \frac{\Delta H \times K_f}{\frac{FN}{WT} - \frac{D}{WT}} \cdot V_t \cdot C_3 \cdot \frac{OAT}{SDT}\ (\text{in C.}°)$$

where Delta T equals the time in seconds, $K_f$ equals the mach correction factor which is dependent upon the altitude and mach. FN is the thrust in pounds, D is the drag in pounds, WT is the gross weight in pounds, $V_t$ is the true airspeed in knots, and $C_3$ is the conversion constant in feet-seconds/nautical mile. OAT is the ambient temperature that is predicted. SDT is the Standard Day Temperature and Δ H is the altitude change in feet. The distance of each segment ΔS is: $\Delta S = \Delta T \times 0.00027762 \times (V_c - V_w)$. $V_c$ is the calibrated airspeed in knots and $V_w$ is the wind velocity in knots and Δ S is the distance in nautical miles. Each segment is calculated with new values for all the variables. The sumation of the segments is repeated until the pseudo-sumated altitude is equal to or greater than the terminal selected altitude, at which time the total elapsed time and total elapsed distance is displayed.

THE OTHER FUNCTIONS

The other functions, namely, the range, fuel page, and trip function are derived from the above permanent data and calculations. With the present speed schedule, the fuel mileage is calculated and the computer recalculates the fuel mileage and speed schedule with the weight change for every 200 mile increment at which a new weight and new speed is recalculated. The mileage is added up until the calculated fuel burn equals the total reserve and total weight of the on-board fuel.

The fuel function uses the same equation as for the range function, but the total distance is loaded and the fuel left over at destination FOD is recalculated for each economy, long-range, cruise and manual schedules.

The trip function utilizes all routines in the computer for the climb, cruise and descent modes. It calculates the optimum climb, and optimum descent and initial optimum altitude. If the initial optimum altitude is too high so that a minimum five minutes cruise at the altitude is not possible, an altitude is calculated which is lower than the optimum altitude which will allow for five minute cruise section.

DEGRADED PERFORMANCE MODIFICATIONS

Referring now to FIGS. 2 and 5, computer 20 is operable to modify its outputs from the theoretical standard in which the aircraft would typically respond by a degraded performance factor as determined by the computer. The degraded performance is the result of excess drag over the supposed theoretical drag at any given EPR and air speed. For example, if during the cruise mode the economy schedule is selected, a TARGET MACH is calculated. A TARGET EPR is computed by computer 20 based on the TARGET MACH. The TARGET EPR is displayed on panel 30 and the EPR bug 54 is moved to the TARGET EPR level when the engage key 52 is pressed. The mach bug 56 is driven to the target mach.

The pilot merely sets his throttles so that his EPR needles 102 align with the EPR bugs 56. The mach actually reached may not be as high as the target mach after the engines reach the EPR target level. The ACTUAL MACH is sensed by the computer 20 and a THEORETICAL EPR is calculated based on the ACTUAL MACH at optimum conditions of the aircraft. The computer 20 then compares the THEORETICAL EPR with the ACTUAL EPR which is approximately the initial TARGET EPR and a performance factor output signal K is determined based on the ratio of the ACTUAL EPR over the THEORETICAL EPR.

To assure an accurate K factor computation, the computer is supplied with a filter which acts as a gate. Only when the actual EPR, mach, and altitude values are within a predefined narrow range, for over a period of time such as 30 seconds, so the aircraft can be said to be in a steady state, will the computer compare the actual EPR with the theoretical EPR. After steady state has been held for 30 seconds, an EPR actual reading is made every 50 milliseconds and compared to the theoretical EPR over a time constant of 15 seconds to get a total of 300 K factor readings. The 300 K factor readings are averaged with each other to get an average K factor.

If a K factor is already known, there still is a desire to keep the K factor corresponding to the present condition of the aircraft. Whenever the steady state of the airplane exceeds 30 seconds, the actual EPR is compared with the theoretical EPR at 50 millisecond intervals. For each K factor readout, it is averaged in to the computed K factor as 1 part in 300. For example, if only five new readings were taken before the aircraft left the steady state, each new K factor readout; $K_1$, $K_2$, $K_3$, $K_4$, and $K_5$, are added together and divided by 300. The calculated value is then added to 295/300 $K_0$, where $K_0$ represents the previously computed K factor.

If the K factor is greater than 1, it indicates that there is excessive drag due to wear and tear of the engines or slightly changed positions of the wing and tail due to body stress which creates excess drag. The computer 20 responds to the K factor signal and uses it to obtain a modified TARGET EPR on the target mach which automatically moves the driven bug to the modified target. The pilot merely resets his throttle to reach the modified EPR as indicated by the bug 54 and the new ACTUAL mach is slightly increased due to the increased EPR target setting.

In this fashion, the EPR settings are corrected for any degraded performance that the aircraft may have over the theoretical performance. The flight profile is corrected dynamically for any excess drag because the computer continuously compares the actual EPR with the calculated theoretical EPR over the predetermined periods of time. If the performance of the aircraft changes during flight, the EPR settings and mach target and mach speed will be compensated for the change in the performance due to any excess drag.

The K factor also is a safety factor to prevent excessive wear and breakage of the engine when a pilot wishes to fly at maximum mach. If maximum mach is based on any theoretical EPR, the EPR of the jet engine may in actuality exceed the EPR certified limit. When the K factor is known and applied, the calculated maximum mach based on actual EPR readouts may be computed. Any selected mach speed exceeding the EPR limits is either automatically lowered so the EPR limit is followed or the display panel indicates in the Flight Level Function Manual Schedule that the desired mach speed is invalid and a lower one must be set. The display panel recommended EPR readouts are not affected by the K factor, so the pilot can visually determine the effect the K factor has by comparing the EPR bugsetting and EPR indicated on the display panel.

MAXIMUM SPEED AND ALTITUDE FUNCTION

Referring to FIG. 6, the maximum allowable speed can be obtained by the computer 20 using a TARGET MACH, the altitude pressure (A), weight (W), total air temperature (TAT), and the performance factor K input signals. The computer 20 derives an ACTUAL EPR readout for the real parameters and TARGET MACH. The computer compares the ACTUAL EPR readout to an EPR LIMIT for the TARGET MACH. If the compared ACTUAL EPR readout is less than the EPR LIMIT, the computer generates a delta signal ($+\Delta$) which is added onto the target speed. If the actual EPR is greater than the EPR limit, the computer adds a negative delta ($-\Delta$) to the target speed to present a modified target speed. The target speed is then used in recalculating the ACTUAL EPR and the EPR LIMIT. The computer 20 recompares the ACTUAL EPR's and EPR LIMITS and a second delta ($\pm\Delta$) is added on to the modified target speed. The deltas ($\pm\Delta$) become sequentially smaller until the modified target speed obtains an actual EPR readout which is equal to the EPR limit. In this fashion, the maximum target speed is calculated quickly and easily using real parameters of altitude, weight, total air temperature and the performance factor of the aircraft so that if the aircraft needs to make up lost time, it can do so without any danger of exceeding the EPR limits for the jet engine at the EPR limits for the calculated speed.

The computer system 11 provides easy-to-follow instructions by not overwhelming the pilot with a vast amount of irrelevant data at any particular time. When any given function, mode and schedule are requested, the display panel displays only the needed variables and output so the pilot may conform the aircraft flight with the displayed signals.

The computer system 11 also provides for a secondary indicator in the form of motor driven bugs which are automatically driven to the desired setting on the EPR and air speed indicator so that the pilot may easily follow the output data by setting his instrument controls so that the indicator needles align with the bugs.

Confusion is eliminated when the bugs are marked inoperative to indicate that the bugs are not driven by the parameters displayed on the display unit 30.

The mode anunciator 18 and engage light 53 are also easily visible by the pilot and clearly shown that the EPR bug is driven by a mode other than that shown on the display panel.

With the program data computer system, a pilot can easily and within a short period of the time determine the best schedule to follow, the best parameters to follow given the desired schedule, and, while following the schedule, can investigate other possible schedules. In this fashion, the pilot can profile his flight in accordance with his individual aircraft's performance and real time variables without relying on averaged charts which may not use real variables in which the aircraft is flying or take into account the degraded performance of the individual aircraft.

The computer 20 can be any processor of generic capability, which typically is capable of driving 16 bit fixed point arithmetic and 32 bit floating point arithmetic, and has polarized interrupt structure, byte and bit manipulation capability, parallel arithmetic unit, parallel buss structure, 32,768 word (8 bits per word) memory addressability and programmed input/output capability. Examples of such computers are the PDP-11M processor manufactured by Norden Division of United Technologies, and the LS-54 processor manufactured by the Instrument Division of Lear Siegler, Inc. of Grand Rapids, Mich. The processor is, of course, connected to a memory storage device having a 20,000 word storage capability for storage of the flight data. In addition, an analog to digital converter is connected to the processor and the flight condition sensors to convert the analog signals to digital signals. In like manner, a digital to analog converter is provided to convert the computer output signals to analog signals for use in the aircraft instruments. Still further, a digital to digital converter is provided to convert the processor output signals to another digital form usable by the CRT display 30.

Reasonable variation and modification are possible within the scope of the foregoing disclosure and drawings without departing from the spirit of the invention which is defined by the appended claims.

The embodiments of the invention in which an exclusive property or privilege is claimed are defined as follows:

1. An on-board aircraft computer system for use with jet engine powered aircraft, the computer system comprising:

input means mounted to the aircraft for generating signals representative of real flight parameters, including the ambient altitude pressure, the total air temperature, the combined weight of the plane, cargo, fuel and passengers, and the actual mach of the aircraft;

computer means coupled to the input means and responding to the real parameter signals received from the input means for producing output signals representing flight profile data for maximum fuel efficiency of the aircraft for the real parameters;

the computer means further produces signals corresponding to the theoretical and actual engine pressure ratios of the aircraft jet engine and produces a degraded performance factor signal proportional to the ratio of the actual and theoretical engine pressure ratios as an indication of a degraded performance of the aircraft;

the computer means responds to the degraded performance factor signal to modify the output signals representing flight profile data for maximum fuel efficiency, taking into account the degrading performance of the aircraft; and indicating means coupled to the computer means responsive to the output signals for displaying the flight profile data within the aircraft.

2. On on-board aircraft computer as defined in claim 1 wherein:

the computer means includes a filter means for comparing actual engine pressure ratio and theoretical engine pressure ratio values only when the aircraft is in a steady state with minimum fluctuation in the actual engine pressure ratio, mach, and altitude over a predetermined period of time to assure an accurate degrade performance factor; the computer means taking all ratios of the actual and theoretical engine pressure ratios and averaging them together with any previously determined degraded performance factor, such that the computer means responds to a degraded performance factor that is accurate under the present existing conditions of the aircraft.

3. An on-board computer as defined in claim 1 wherein:

the input means further generates a signal representing a cost index factor which represents the time dependent costs in flight compared to fuel costs during flight; and the computer means further responds to the cost index factor signal to produce output signals representing a most economical flight profile schedule taking into account both the time dependent costs and the extra costs of fuel consumed at faster speeds.

4. An on-board aircraft computer system for use with jet engine powered aircraft, the computer system comprising:

input means mounted to the aircraft for generating signals representative of real flight parameters, including ambient altitude pressure, the total air temperature, the combined weight of the plane, cargo, fuel and passengers;

computer means coupled to the input means and responsive to the real flight parameter signals received from the input means for producing output signals representing flight profile data for maximum fuel efficiency of the aircraft for the real parameters;

indicating means coupled to the computer means responsive to the output signals for displaying and flight profile data within the aircraft; and an altitude performance selector actuably coupled to the computer means such that the computer means becomes responsive to the flight parameter input signals representing the actual real time altitude and a selected second altitude for producing an output signal representing a change in the wind component needed at a selected altitude to obtain a flight profile which is as efficient as the flight profile at the real time altitude.

5. An on-board aircraft computer system for use with jet engine powered aircraft, the computer system comprising:

input means mounted to the aircraft for generating signals representative of real flight parameters, including ambient altitude pressure, the total air temperature, the combined weight of the plane, cargo, fuel and passengers;

computer means coupled to the input means and responding to the real flight parameter signals received from the input means for producing output signals representing flight profile data for maximum fuel efficiency of the aircraft for the real parameters;

indicating means coupled to the computer means responsive to the output signals for displaying the flight profile data within the aircraft;

a mode selector having climb, cruise and descent mode positions and operably coupled to the computer means;

the computer means is responsive to the input signals for producing output signals representing optimum mach, optimum altitude, and engine pressure ratios when the mode selector is in the cruise position;

the computer means is responsive to the input signals for producing output signals representing the engine pressure ratio limits and optimum speed when the mode selector is in the climb position; and the computer means utilizes the input signals for producing output signals indicating an optimum descent when the mode selector is in the descent position, the output signals representing the distance from the destination that descent should commence, the time it takes for descent at the optimum air speed.

6. An on-board computer as defined in claim 5 wherein: the computer means responds to the input signals representing the real flight parameters to produce output signals corresponding to a long range cruise flight profile of the aircraft wherein the fuel mileage of the aircraft is approximately 99% of the maximum possible;

a schedule selector is coupled to the computer means and is actuable between a long range cruise schedule and most economical cruise schedules when the first mode selector is positioned so that the computer means is in the cruise mode; and the indicating means are operably connected to the schedule selector such that only one of the long range cruise profiles and the most economical cruise profile is indicated depending on which schedule is actuated by the schedule selector.

7. An on-board computer as defined in claim 6 wherein the computer means is responsive to the input signals representing the real flight parameters to produce output signals corresponding to the maximum rate of climb of the aircraft;

the schedule selector is operable between a most economical schedule and maximum rate of climb schedule when the first mode selector is positioned so that the computer means is in the climb mode and the schedule selector is in the maximum rate position; and the indicating means is operably connected to the schedule selector such that only one of the maximum rate of climb profiles and the most economical climb profile is indicated depending on which schedule is actuated by the schedule selector.

8. An on-board computer as defined in claim 5 wherein:

the computer means is responsive to input signals representing the actual real time altitude and a selected second altitude to produce output signals representing the time and distance required to achieve the selected second altitude.

9. An on-board aircraft computer system for use with jet engine powered aircraft, the computer system comprising:

input means mounted to the aircraft for generating signals representative of real flight parameters, including real air mass measurements and real aircraft dynamic measurements;

computer means coupled to the input means and responding to the real parameter signals received from the input means for producing output signals representing flight profile data for maximum fuel efficiency of the aircraft for the real parameters;

the computer means is further responsive to the real parameter input signals to generate signals corresponding to the maximum altitude for a given mach and the maximum mach for a given altitude without exceeding the engine pressure ratio limits of the jet engines for the altitudes and machs;

the computer means produces output signals representing the maximum safe mach by responding to an arbitrary target mach, the weight, altitude, pressure and total air temperature inputs to produce an engine pressure ratio output signal for the target mach;

the computer means is responsive to the input means signals to produce an engine pressure ratio output signal for the target mach and compares the engine pressure ratio signal with the engine pressure ratio limit;

the computer means adds or subtracts an increment to the target mach to obtain a modified target mach, depending on whether the engine pressure ratio output signal was less or greater than the engine pressure ratio limit;

the computer means responds to the added or subtracted increment and produces an engine pressure ratio output signal and engine pressure limit signal for the modified target mach, a subsequent increment being subtracted or added until the engine pressure ratio signal equals the engine pressure ratio limit;

the computer means is responsive to the maximum safe mach output signal and a selected mach input signal to produce a warning output signal if the selected mach input signal represents a mach higher than the maximum safe mach represented by the corresponding output signal; and visual indicating means coupled to the computer means responsive to the output signals for displaying the flight profile data within the computer, the visual indicating means displaying a warning indication responsive to the warning output signal produced by the computer means.

10. An on-board aircraft computer system for use with aircraft powered by jet engines, the computer system comprising:

input means mounted to the aircraft for producing signals representative of real flight parameters of the aircraft and producing signals representative of the time dependent costs of the aircraft;

computer means coupled to the input means and responding to the real parameter and time dependent costs signals received from the input means for producing output signals representing flight profile data for total minimum costs of the flight; and indicating means coupled to the computer means for receiving the output signals and displaying the flight profile data within the aircraft.

11. An on-board aircraft computer as defined in claim 10 wherein:

the computer means further produces signals corresponding to the theoretical and actual engine pressure ratios of the aircraft jet engine and produces a degraded performance factor signals proportional to the ratio of the actual and theoretical engine pressure ratios as an indication of a degraded performance of the aircraft; and the computer means responds to the degraded performance factor signal to modify the output signals representing flight profile data for total minimum costs, taking into account the degraded performance of the aircraft.

12. An on-board computer system as defined in claim 10 further comprising an altitude performance selector actuably coupled to the computer means such that the computer means becomes responsive to the flight parameter input signals representing the actual real time altitude and a selected second altitude for producing an output signal representing a change in the wind component needed at the selected altitude to obtain a flight profile which is as efficient as the flight profile at the present altitude.

13. An on-board computer system defined in claim 10 and further comprising a mode selector having climb, cruise and descent mode positions and operably coupled to the computer means whereby:

the computer means is responsive to the input signals for producing output signals representing optimum mach, optimum altitude, and engine pressure ratios when the mode selector is in the cruise position;

the computer means is responsive to the input signals for producing output signals representing the engine pressure ratio limits and optimum speed when the mode selector is in the climb position; and the computer means utilizes the input signals for producing output signals indicating an optimum descent when the mode selector is in the descent position, the output signals representing the distance from the destination descent should commence, the time it takes for descent and the optimum air speed.

14. An on-board computer as defined in claim 13 wherein:

the computer means is responsive to input signals representing the actual real time altitude and a selected second altitude to produce output signals representing the time and distance required to achieve the selected second altitude.

15. An on-board computer as defined in claim 10 wherein:

the computer means is responsive to the real parameter input signals to generate signals corresponding to the maximum altitude for a given mach and the maximum mach for a given altitude without exceeding the engine pressure ratio limits of the jet engines for said altitudes and machs.

16. An on-board aircraft computer system as defined in claim 15 wherein:

the computer means produces output signals representing the maximum safe mach by responding to an arbitrary target mach, the weight, altitude pressure and total air temperature inputs to produce an engine pressure ratio output signal for the target mach;

the computer means is responsive to the input to produce the engine pressure ratio limit output signal for the target mach and compares the engine pressure ratio readout with the engine pressure ratio limit;

the computer means adds or subtracts an increment to the target mach, obtaining a modified target mach, depending on whether the engine pressure ratio readout was less or greater than the engine pressure ratio limit;

the computer means responds to the added or subtracted increment and produces an engine pressure ratio output signal and engine pressure ratio limit signal for the modified target mach; a subsequent increment being subtracted or added until the engine pressure ratio readout equals the engine pressure ratio limit;

the computer means is responsive to the maximum safe mach output signal and a selected mach input signal to produce a warning output signal if the selected mach input signal represents a mach higher than the maximum safe mach represented by the corresponding output signal; and the visual indicating means displays a warning indication responsive to the warning output signal produced by the computer means.

17. An on-board aircraft computer system for use with jet engine powered aircraft, the computer system comprising:

input means mounted to the aircraft for generating signals representative of real flight parameters, including real air mass measurements and real aircraft dynamic measurements;

computer means coupled to the input means and responding to the real parameter signals received from the input means for producing output signals representing flight profile data for maximum fuel efficiency of the aircraft for the real parameters;

the computer means modifies the output signals representing flight profile data and the computer further modifies the output signals such that the fuel mileage of the aircraft is reduced to approximately 99% of the maximum possible fuel efficiency; and visual indicating means coupled to the computer means responsive to the output signals for displaying the flight profile data within the aircraft.

18. An on-board aircraft computer as defined in claim 17 wherein:

the computer means further produces signals corresponding to the theoretical and actual engine pressure ratios of the aircraft jet engine and produces a degraded performance factor signal proportional to the ratio of the actual and theoretical engine pressure ratios as an indication of a degraded performance of the aircraft; and the computer means responds to the degraded performance factor signal to modify the output signals corresponding to a long-range cruise flight schedule, taking into account the degraded performance of the aircraft.

19. An on-board computer system as defined in claim 17 further comprising an altitude performance selector actuably coupled to the computer means such that the computer means becomes responsive to the flight parameter input signals representing the actual real time altitude and a selected second altitude for producing an output signal representing a change in the wind component needed at the selected altitude to obtain a flight profile which is as efficient as the flight profile at the present altitude.

20. An on-board computer system defined in claim 17 and further comprising a mode selector having climb, cruise and descent mode positions and operably coupled to the computer means wherein:

the computer means is responsive to the input signals for producing output signals representing optimum mach, optimum altitude, and engine pressure ratios when the mode selector is in the cruise position;

the computer means is responsive to the input signals for producing output signals representing the engine pressure ratio limits and optimum speed when the mode selector is in the climb position; and the computer means utilizes the input signals for producing output signals indicating an optimum descent when the mode selector is in the descent position, the output signals representing the distance from the destination descent should commence, the time it takes for descent and the optimum air speed.

21. An on-board computer as defined in claim 20 wherein:

the computer means is responsive to input signals representing the actual real time altitude and a selected second altitude to produce output signals representing the time and distance required to achieve the selected second altitude.

22. An on-board computer as defined in claim 17 wherein:

the computer means is responsive to the real parameter input signals to generate signals corresponding to the maximum altitude for a given mach and the maximum mach for a given altitude without exceeding the engine pressure ratio limits of the jet engines for said altitudes and machs.

23. An on-board aircraft computer system as defined in claim 22 wherein:

the computer means produces output signals representing the maximum safe mach by responding to an arbitrary target mach, the weight, altitude pressure and total air temperature inputs to produce an engine pressure ratio output signal for the target mach;

the computer means is responsive to the input to produce the engine pressure ratio limit output signal for the target mach and compares the engine pressure ratio readout with the engine pressure ratio limit;

the computer means adds or subtracts an increment to the target mach obtaining a modified target mach, depending on whether the engine pressure ratio readout was less or greater than the engine pressure ratio limit;

the computer means responds to the added or subtracted increment and produces an engine pressure ratio output signal and engine pressure ratio limit signal for the modified target mach; a subsequent increment being subtracted or added until the engine pressure ratio readout equals the engine pressure ratio limit;

the computer means is responsive to the maximum safe mach output signal and a selected mach input signal to produce a warning output signal if the selected mach input signal represents a mach higher than the maximum safe mach represented by the corresponding output signal; and the visual indicating means displays a warning indication responsive to the warning output signal produced by the computer means.

24. An on-board aircraft computer system for use with jet powered aircraft, the computer system comprising:
- input means for providing signals indicating real flight parameters including the ambient altitude pressure, the total air temperature, and the combined weight of the plane, cargo, fuel and passengers;
- computer means coupled to the input means and responding to the real parameter signals for producing output signals corresponding to the maximum altitude for a given mach or the maximum mach for a given altitude without exceeding engine pressure ratio limits of the jet engine;
- the computer means produces output signals representing maximum safe mach by responding to an arbitrary target mach, the weight, altitude pressure and total air temperature inputs to produce an engine pressure ratio output signal for the target mach;
- the computer means is responsive to the input means to produce the engine pressure ratio limit output signal for the target mach and compares the engine pressure ratio output signal with the engine pressure ratio limit signal;
- the computer means adds or subtracts an increment to the target mach, obtaining modified target mach, depending on whether the engine pressure ratio readout is less or greater than the engine pressure ratio limit;
- the computer means responds to the added or subtracted increment and produces an engine pressure ratio output signal and engine pressure ratio limit signal for the modified target mach, a subsequent increment being subtracted or added until the engine pressure ratio signal equals the engine pressure ratio limit signal;
- the computer means is responsive to the maximum safe mach output signal and a selected mach input signal to produce a warning output signal if the selected mach input signal represents a mach higher than the maximum safe mach represented by the corresponding output signal; and
- visual indicating means responsive to the output signals for displaying the maximum altitude and maximum mach for a given altitude, and the visual indicating means displays a warning indication responsive to the warning output signal produced by the computer means.

25. An on-board aircraft computer system for use with a jet powered aircraft, the computer system comprising:
- input means for providing signals indicating real flight parameters including air mass parameters and real aircraft dynamic measurements and the actual mach of the aircraft;
- computer means coupled to the input means and responding to the real parameter signals for producing output signals corresponding to the maximum altitude for a given mach or the maximum mach for a given altitude without exceeding engine pressure ratio limits of the jet engine;
- the computer means further produces signals corresponding to the theoretical and actual engine pressure ratios of the aircraft jet engine and produces a degraded performance factor signal proportional to the ratio of the actual and theoretical engine pressure ratios as an indication of a degraded performance of the aircraft;
- the computer means responds to the degraded performance factor signal to modify the output signals corresponding to the maximum altitude for a given mach and the maximum mach for a given altitude, taking into account the degraded performance of the aircraft; and
- visual indicating means responsive to the output signals for displaying the maximum altitude and maximum mach for the given altitude within the aircraft.

* * * * *